US007050903B1

(12) United States Patent
Shutter et al.

(10) Patent No.: US 7,050,903 B1
(45) Date of Patent: May 23, 2006

(54) METHOD AND SYSTEM FOR DEVELOPING TRAFFIC MESSAGES

(75) Inventors: Jon D. Shutter, Chicago, IL (US); Timothy McGrath, Chicago, IL (US)

(73) Assignee: Navteq North America, LLC, Chicago, IL (US)

( * ) Notice: Subject to any disclaimer, the term of this patent is extended or adjusted under 35 U.S.C. 154(b) by 185 days.

(21) Appl. No.: 10/668,470

(22) Filed: Sep. 23, 2003

(51) Int. Cl.
*G06F 19/00* (2006.01)
*G06G 7/76* (2006.01)

(52) U.S. Cl. ........................ 701/117; 701/118; 701/119; 701/210; 340/907; 340/995.13

(58) Field of Classification Search ................ 701/117, 701/118, 119, 200, 205, 206, 210, 23, 24, 701/28; 73/178 R; 340/901, 907, 995.13
See application file for complete search history.

(56) References Cited

U.S. PATENT DOCUMENTS

| | | | | |
|---|---|---|---|---|
| 5,173,691 | A | 12/1992 | Sumner | 340/905 |
| 6,216,085 | B1 | 4/2001 | Emmerink et al. | 701/117 |
| 6,298,301 | B1 | 10/2001 | Kim | 701/200 |
| 6,317,058 | B1 * | 11/2001 | Lemelson et al. | 340/910 |
| 6,338,019 | B1 | 1/2002 | Duckeck | 701/200 |
| 6,434,477 | B1 | 8/2002 | Goss et al. | 701/117 |
| 6,438,561 | B1 | 8/2002 | Israni et al. | 707/104.1 |
| 6,453,230 | B1 | 9/2002 | Geurts | 701/117 |
| 6,594,282 | B1 | 7/2003 | Kynast et al. | 370/493 |
| 6,633,238 | B1 * | 10/2003 | Lemelson et al. | 340/909 |
| 6,633,808 | B1 | 10/2003 | Schulz et al. | 701/117 |
| 6,643,581 | B1 | 11/2003 | Ooishi | 701/207 |
| 6,741,932 | B1 * | 5/2004 | Groth et al. | 701/210 |
| 6,754,580 | B1 * | 6/2004 | Ask et al. | 701/117 |
| 2003/0083813 | A1 | 5/2003 | Park | 701/210 |
| 2003/0102988 | A1 | 6/2003 | Hempel et al. | 340/905 |

FOREIGN PATENT DOCUMENTS

| | | | |
|---|---|---|---|
| EP | 1004852 | A2 | 8/1999 |

* cited by examiner

*Primary Examiner*—Olga Hernandez
(74) *Attorney, Agent, or Firm*—Jon D. Shutter; Frank J. Kozak; Lawrence M. Kaplan

(57) ABSTRACT

A method of facilitating delivery of traffic messages is disclosed. Data indicating a plurality of traffic conditions on a road network are obtained. For each of the traffic conditions, the data provides a location description. For each of the traffic conditions, the location description is converted into a location reference code assigned by a traffic message supplier. A plurality of traffic messages representing the traffic conditions is transmitted. Each of the traffic messages includes the location reference code of the traffic condition.

22 Claims, 14 Drawing Sheets

| 114<br>TABLE ID | 116<br>LOC ID | 118<br>LOC TYPE | 120<br>ROAD # | 122<br>ROAD NAME | 124<br>FIRST NAME | 126<br>SECOND NAME | 128<br>AREA REF | 130<br>LINEAR REF | 132<br>- OFFSE T | 134<br>+ OFFSET | 136<br>LAT | 138<br>LON |
|---|---|---|---|---|---|---|---|---|---|---|---|---|
| 06 | 00001 | A1 | | | LA METRO | | | | | | | |
| 06 | 00002 | A1 | | | SAN DIEGO METRO | | | | | | | |
| .. | | | | | | | | | | | | |
| 06 | 00111 | L1 | I-5 | | SOUTH BOUND | NORTH BOUND | 00002 | | | | | |
| 06 | 00114 | L1 | CA-15 | | SOUTH BOUND | NORTH BOUND | 00002 | | | | | |
| .. | | | | | | | | | | | | |
| 06 | 04965 | P1 | I-5 | | US/MEX BORDER | | 00002 | 00111 | | 04966 | 003254240 | - 11702959 |
| 06 | 04966 | P1 | I-5 | | CAMINO DE LA PLAZA | | 00002 | 00111 | 04965 | 04967 | 003254417 | - 11703229 |
| 06 | 04967 | P1 | I-5 | | I-805 | | 00002 | 00111 | 04966 | 04968 | 003254611 | - 11703531 |
| .. | | | | | | | | | | | | |
| 06 | 05529 | P1 | CA-15 | | I-5 | | 00002 | 00114 | | 05530 | 003268936 | - 11711635 |
| 06 | 00530 | P1 | CA-15 | | MAIN ST | | 00002 | 00114 | 05529 | 05531 | 003269464 | - 11712068 |

112

FIG. 5

| SERVICE PROVIDER MESSAGE (ALERT C, 3A MESSAGE) 222(3) | | |
|---|---|---|
| **BYTE** | **BITS** | **FIELD** |
| BYTE 1 | 7-5 | 000 - RESERVED |
| BYTE 1 | 4 | MESSAGE TYPE = 1 |
| BYTE 1 | 3-0 | SERVICE AND TABLE PROVIDER = 1001 |
| BYTE 2 | 7-2 | LOCATION TABLE NUMBER |
| BYTE 2 | 1-0 | 0000 - RESERVED |
| BYTE 3 | 7-6 | |
| BYTE 3 | 5-0 | SERVICE PROVIDER ID |
| BYTE 4 | 7-0 | BROADCAST SERVICE AREA CODE |
| BYTE 5 | 7-0 | |

| TRAFFIC MESSAGE (ALERT C, 8A MESSAGE) 222(4) | | |
|---|---|---|
| **BYTE** | **BITS** | **FIELD** |
| BYTE 1 | 7-5 | 000 - RESERVED |
| BYTE 1 | 4 | MESSAGE TYPE = 0 |
| BYTE 1 | 3 | SINGLE GROUP MESSAGE = 1 |
| BYTE 1 | 2-0 | DURATION CODE |
| BYTE 2 | 7 | DIVERSION = 0 (RECOMMEND NO DIVERSION) |
| BYTE 2 | 6 | DIRECTION (0 = POSITIVE) |
| BYTE 2 | 5-3 | EXTENT |
| BYTE 2 | 2-0 | EVENT CODE |
| BYTE 5 | 7-0 | |
| BYTE 2 | 7-0 | LOCATION |
| BYTE 5 | 7-0 | |

FIG. 13c

METHOD AND SYSTEM FOR DEVELOPING TRAFFIC MESSAGES

REFERENCE TO RELATED APPLICATION

The present application is related to the co-pending application entitled "METHOD AND SYSTEM FOR DEVELOPING TRAFFIC MESSAGES" filed on the same date herewith, Ser. No. 10/668,916, the entire disclosure of which is incorporated by reference herein. The present application is also related to the co-pending application entitled "METHOD AND SYSTEM FOR DEVELOPING TRAFFIC MESSAGES" filed on the same date herewith, Ser. No. 10/668,738, the entire disclosure of which is incorporated by reference herein. Additionally, the present application is related to the co-pending application entitled "METHOD AND SYSTEM FOR DEVELOPING TRAFFIC MESSAGES" filed on the same date herewith, Ser. No. 10/668,932, the entire disclosure of which is incorporated by reference herein.

BACKGROUND OF THE INVENTION

The present invention relates to a system and method for providing traffic data to mobile users, such as vehicles traveling on roads, and more particularly, the present invention relates to a system and method that develops traffic messages for broadcast.

In some metropolitan areas and countries, systems have been implemented that broadcast data messages that contain up-to-the-minute reports of traffic and road condition information. These systems broadcast the data messages on a continuous, periodic, or frequently occurring basis. Receivers installed in vehicles that travel in the region receive the data messages. The receivers decode the data messages and make the information in the messages available to the vehicle drivers.

The traffic data message broadcast systems have several advantages over radio stations simply broadcasting traffic reports. For example, with the traffic data message broadcasting systems, a driver can obtain the traffic information quickly. The driver does not have to wait until the radio station broadcasts a traffic report. Another advantage of the traffic data message broadcast systems is that the driver does not have to listen to descriptions of traffic conditions for areas remote from his or her location. Another advantage of traffic data message broadcast systems is that more detailed and possibly more up-to-date information can be provided. In these types of systems, the data messages conform to one or more pre-established specifications or formats. The in-vehicle receivers decode the traffic data messages using the pre-established specifications or formats.

One system for broadcasting traffic and road condition information is the Radio Data System-Traffic Message Channel ("RDS-TMC"). The RDS-TMC system is used in some European countries. The RDS-TMC system broadcasts messages to vehicles using an FM station data channel. RDS-TMC messages are broadcast regularly or at varying intervals.

One challenge with broadcasting traffic and road condition messages is creating these messages. Traffic and road condition data may be collected from a variety of sources in a variety of different data formats. The traffic and road condition data must be assimilated and transformed into a group of messages that indicate relevant traffic and road conditions. Additionally, the broadcast bandwidth for the messages may be limited, so only a limited number of messages may be broadcast. Furthermore, the end user computing platform may only be able to handle a limited number of messages. Moreover, the end user computing platform may desire to select the traffic messages relevant to its present location.

Accordingly, it would be beneficial to have a way to collect traffic and road condition data, to develop a group of messages that indicate relevant traffic and road conditions for broadcast.

SUMMARY OF THE INVENTION

To address these and other objectives, the present invention comprises a method of facilitating delivery of traffic messages. Data indicating a plurality of traffic conditions on a road network are obtained. For each of the traffic conditions, the data provides a location description. For each of the traffic conditions, the location description is converted into a location reference code assigned by a traffic message supplier. A plurality of traffic messages representing the traffic conditions is transmitted. Each of the traffic messages includes the location reference code of the traffic condition.

BRIEF DESCRIPTION OF THE DRAWINGS

FIG. 5 is an example of a portion of a traffic location table illustrated in FIG. 3.

FIG. **13*a*** is a diagram illustrating a traffic packet.

Figures 13A, 13B:
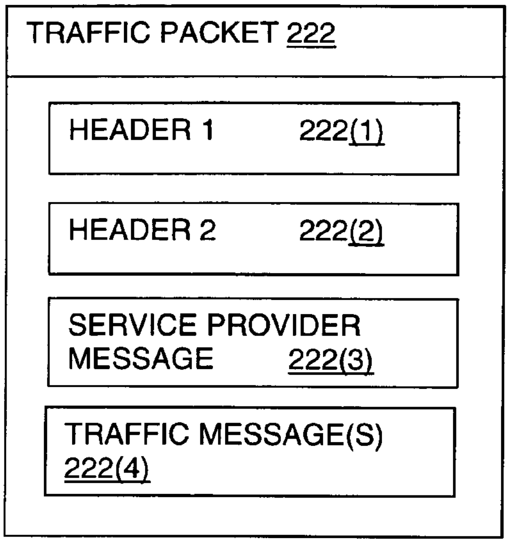

FIG. **13*b* is a diagram illustrating a service provider message included in the traffic packet of FIG. 13*a***.

FIG. **13*c* is a diagram illustrating a traffic message included in the traffic packet of FIG. 13*a***.

DETAILED DESCRIPTION OF THE PRESENTLY PREFERRED EMBODIMENTS

I. Traffic Information Broadcast System—Overview

Figure 1:
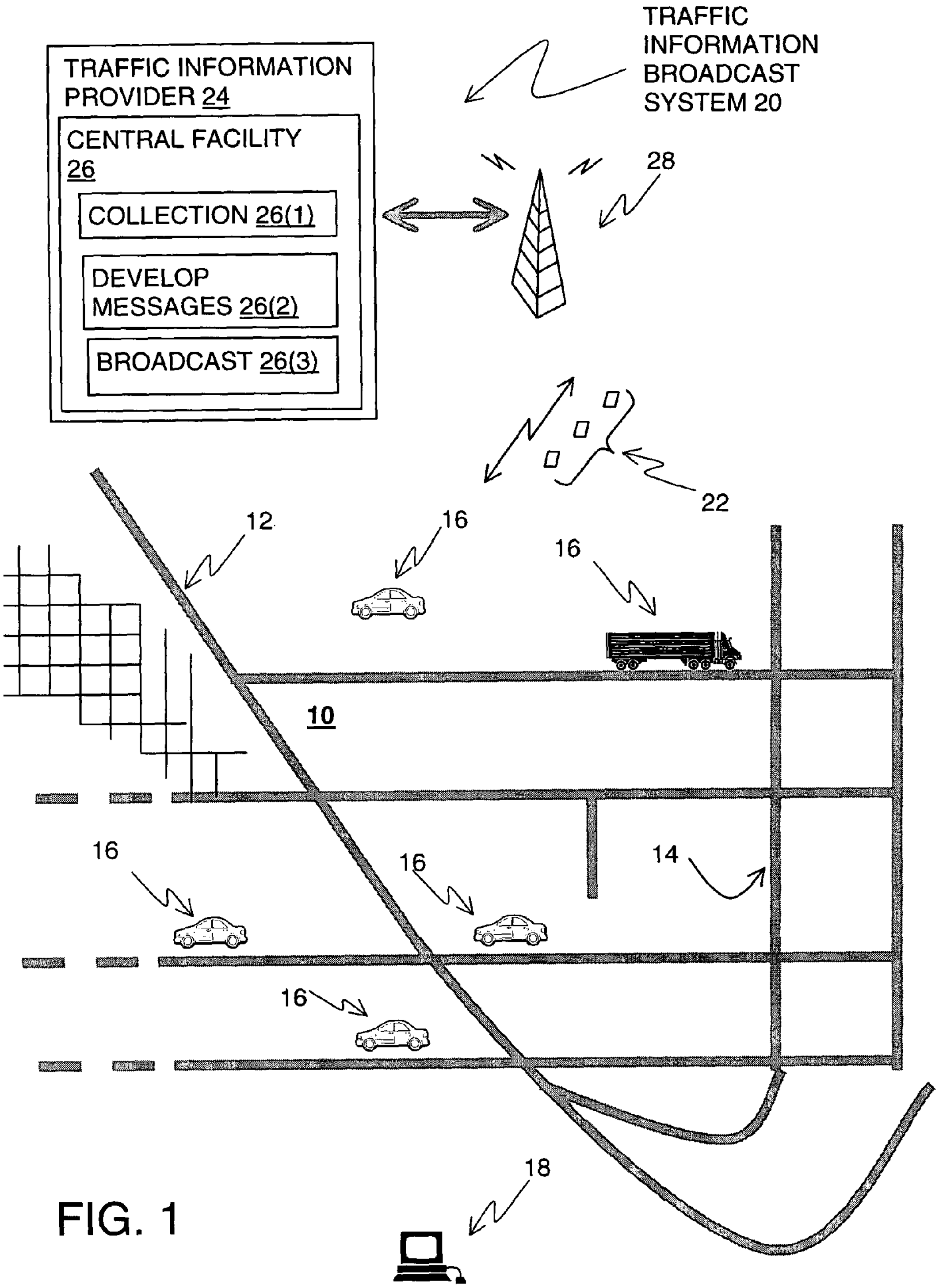
FIG. 1 is a diagram illustrating components of a traffic broadcast system in a geographic region.

FIG. 1 is a diagram illustrating a geographic region 10. The geographic region 10 includes a road network 12 comprising numerous road segments 14 on which numerous vehicles 16 travel. The vehicles 16 may include cars, trucks, buses, bicycles, motorcycles, etc. The geographic region 10 may be a metropolitan area, such as the New York metropolitan area, the Chicago metropolitan area, or any other metropolitan area. Alternatively, the geographic region 10 may be a state, province, or country, such as California, Illinois, France, England, or Germany. Alternatively, the geographic region 10 can be a combination of one or more metropolitan areas, states, countries and so on.

A traffic information broadcast system 20 broadcasts traffic messages 22 regarding the traffic and road conditions on the road network 12 in the geographic region 10. A traffic information provider 24 operates the traffic information broadcast system 20. Some or all of the vehicles 16 include suitable equipment that enables them to receive the traffic messages 22 broadcast by the traffic information broadcast system 20. The traffic messages 22 may also be received and used in systems that are not installed in vehicles (e.g., "non-vehicles 18"). These non-vehicles 18 may include workstations, personal computers, personal digital assistants, networks, pagers, televisions, radio receivers, telephones, and so on. The non-vehicles 18 that receive the traffic messages 22 may obtain them in the same manner as the vehicles, i.e., by broadcast. Alternatively, the non-vehicles 18 may receive the traffic messages 22 by other means, such as over telephone lines, over the Internet, via cable, and so on. The systems in the vehicles 16 or in the non-vehicles 18 that receive the traffic messages 22 may include various different platforms as known to those skilled in the art.

Figure 2:
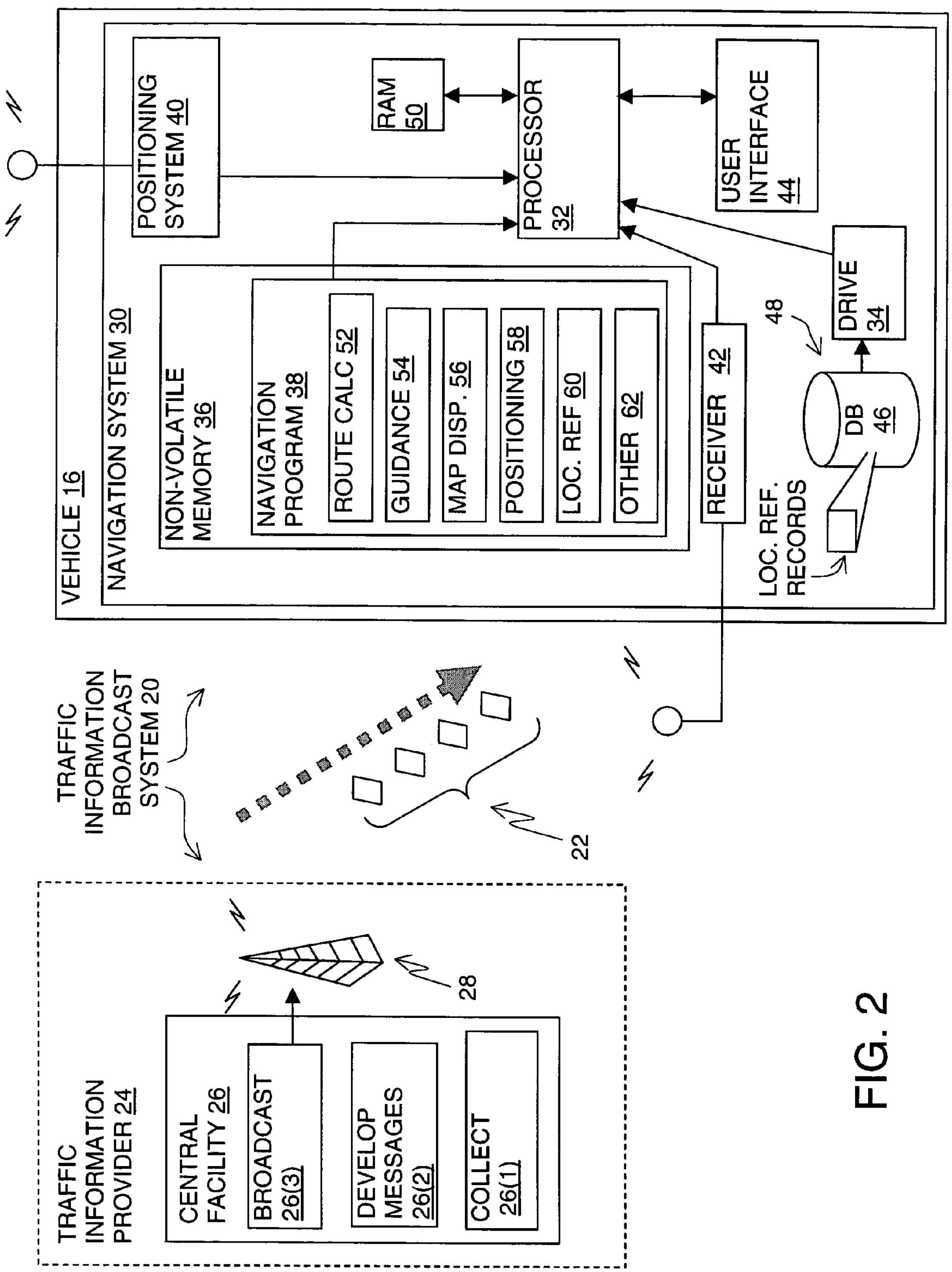
FIG. 2 is a block diagram illustrating components of the traffic broadcast system and one of the vehicles with an on-board navigation system, as shown in FIG. 1.

FIG. 2 shows diagrammatically the components of the traffic information broadcast system 20 and one of the vehicles 16 in FIG. 1. The traffic information broadcast system 20 provides for collecting of data relating to traffic and road conditions, developing traffic messages from the collected data, and transmitting the traffic messages 22 to the vehicles 16 and non-vehicles 18 in the region 10 on a regular and continuing basis.

The traffic information broadcast system 20 includes a central facility 26 operated by the traffic information provider 24. The central facility 26 includes equipment and programming 26(1) for collecting the data relating to traffic and road conditions in the region 10 from various sources or manual input. The central facility 26 also includes equipment and programming 26(2) for developing the traffic messages from the collected traffic and road condition data. Furthermore, the central facility 26 includes suitable equipment and programming 26(3) for broadcasting the traffic messages 22. To broadcast the traffic messages 22, the traffic information broadcast system 20 includes transmission equipment 28. The transmission equipment 28 may comprise one or more FM transmitters, including antennas, or other wireless transmitters. The transmission equipment 28 provides for broadcasting the traffic messages 22 throughout the region 10. The transmission equipment 28 may be part of the traffic information broadcast system 20, or alternatively, the transmission equipment 28 may use equipment from other types of systems, such as cellular or paging systems, satellite radio, FM radio stations, and so on, to broadcast traffic messages 22 to the vehicles 16 and non-vehicles 18 in the region. In one embodiment, the central facility 26 transmits the traffic messages 22 to a broadcaster that broadcasts the traffic messages 22. (For purposes of this disclosure and the appended claims, the broadcasting of traffic messages is intended to include any form of transmission, including direct wireless transmission.)

Vehicles 16 and non-vehicles 18 in the region 10 have appropriate equipment for receiving the traffic messages 22. In one embodiment, installed in some of the vehicles 16 are a navigation system 30 that can receive and use the traffic messages 22. As shown in FIG. 2, the navigation system 30 is a combination of hardware and software components. In one embodiment, the navigation system 30 includes a processor 32, a drive 34 connected to the processor 32, and a non-volatile memory storage device 36 for storing navigation application software programs 38 and possibly other information. The processor 32 may be of any type used in navigation systems.

The navigation system 30 may also include a positioning system 40. The positioning system 40 may utilize GPS-type technology, a dead reckoning-type system, or combinations of these, or other systems, all of which are known in the art. The positioning system 40 may include suitable sensing devices that measure the traveling distance speed, direction, and so on, of the vehicle. The positioning system 40 may also include appropriate technology to obtain a GPS signal, in a manner that is known in the art. The positioning system 40 outputs a signal to the processor 32. The navigation application software program 38 that is run on the processor 32 may use the signal from the positioning system 40 to determine the location, direction, speed, etc., of the vehicle 16.

Referring to FIG. 2, the vehicle 16 includes a traffic message receiver 42. The receiver 42 may be a satellite radio or FM receiver tuned to the appropriate frequency used by the traffic broadcast information system 20 to broadcast the traffic messages 22. The receiver 42 receives the traffic messages 22 from the traffic data provider 24. (In an alternative in which the traffic messages are sent by a direct wireless transmission, such as via a cellular wireless transmission, the receiver 42 in the vehicle 16 may be similar or identical to a cellular telephone.) The receiver 42 provides an output to the processor 32 so that appropriate programming in the navigation system 30 can utilize the traffic messages 22 broadcast by the traffic broadcast system 20 when performing navigation functions, as described more fully below.

The navigation system 30 also includes a user interface 44 that allows the end user (e.g., the driver or passengers) to input information into the navigation system. This input information may include a request to use the navigation features of the navigation system 30.

The navigation system 30 uses a geographic database 46 stored on a storage medium 48. In this embodiment, the storage medium 48 is installed in the drive 34 so that the geographic database 46 can be read and used by the navigation system 40. In one embodiment, the geographic data 46 may be a geographic database published by Navigation Technologies of Chicago, Ill. The storage medium 48 and the geographic database 46 do not have to be physically provided at the location of the navigation system 30. In alternative embodiments, the storage medium 48, upon which some or all of the geographic data 46 are stored, may be located remotely from the rest of the navigation system 30 and portions of the geographic data provided via a communications link, as needed.

In one exemplary type of system, the navigation application software program 38 is loaded from the non-volatile memory 36 into a RAM 50 associated with the processor 32 in order to operate the navigation system 30. The processor 32 also receives input from the user interface 44. The input may include a request for navigation information. The navigation system 30 uses the geographic database 46 stored on the storage medium 48, possibly in conjunction with the outputs from the positioning system 40 and the receiver 42, to provide various navigation features and functions. The navigation application software program 38 may include separate applications (or subprograms) that provide these various navigation features and functions. These functions and features may include route calculation 52 (wherein a route to a destination identified by the end-user is determined), route guidance 54 (wherein detailed directions are provided for reaching a desired destination), map display 56, and vehicle positioning 58 (e.g., map matching).

Also included in the programming 38 on the navigation system is location referencing programming 60. The location referencing programming 60 facilitates using data contained in the traffic messages 22 when performing navigation functions. A method for providing this feature is disclosed in U.S. Pat. No. 6,438,561, entitled "METHOD AND SYSTEM FOR USING REAL-TIME TRAFFIC BROADCASTS WITH NAVIGATION SYSTEMS", the entire disclosure of which is incorporated by reference herein. U.S. Pat. No. 6,438,561 discloses a method and system in which location reference codes used in traffic messages 22 are related to geographic data used by the navigation system 30 thereby enabling navigation system 30 to use the information contained in traffic message broadcasts. Using data from broadcast traffic messages 22 together with a geographic database 46 allows the navigation system 30 to provide route calculation that considers up-to-the-minute traffic and road conditions when determining a route to a desired destination.

Other functions and programming 62 may be included in the navigation system 30. The navigation application program 38 may be written in a suitable computer programming language such as C, although other programming languages, such as C++ or Java, are also suitable. All of the components described above may be conventional (or other than conventional) and the manufacture and use of these components are known to those of skill in the art.

II. Method And System For Developing Traffic Messages

A. General Overview

Figure 3:
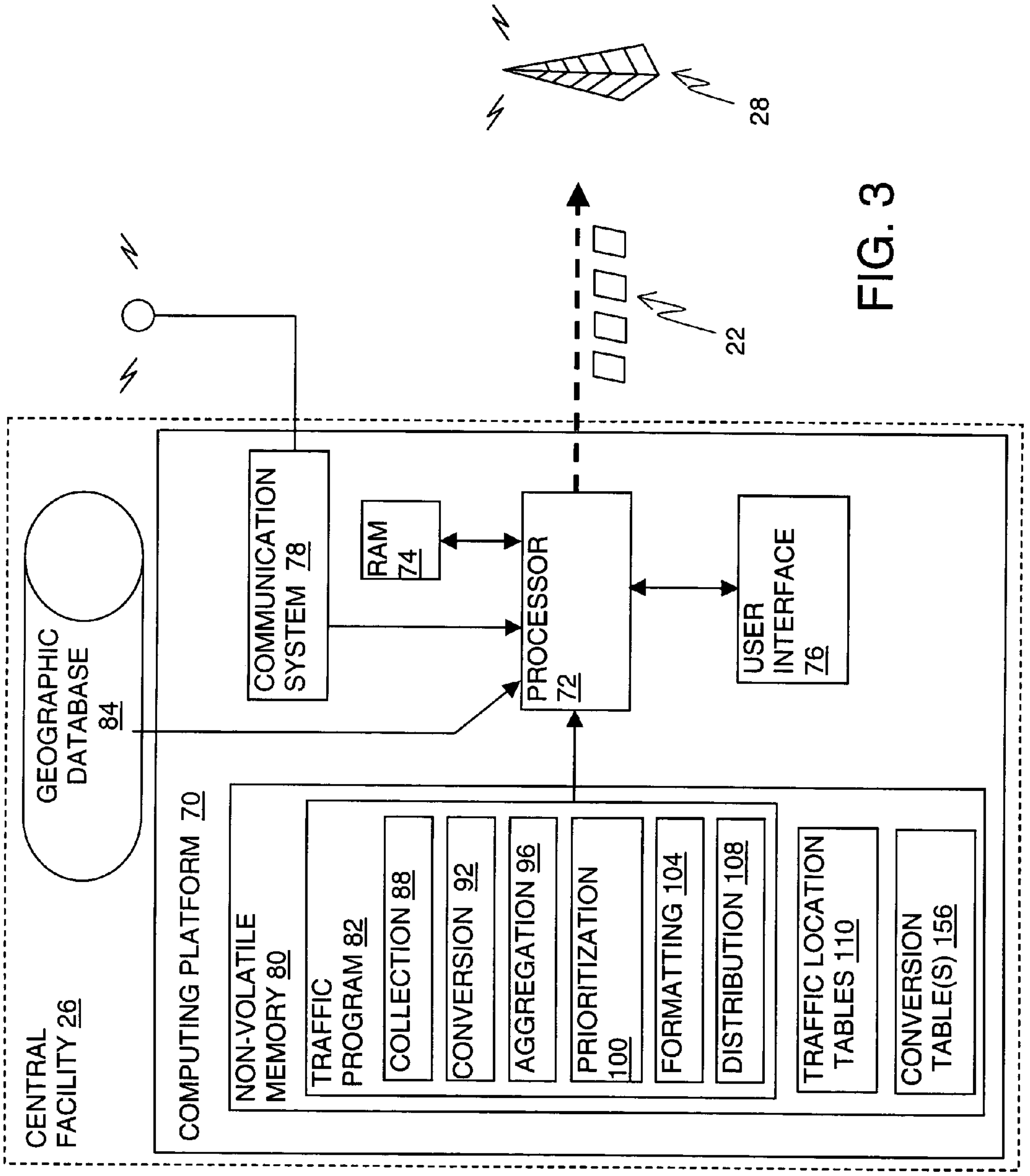
FIG. 3 is a block diagram illustrating the components of a central facility of the traffic broadcast system as shown in FIGS. 1 and 2.

The traffic information broadcast system 20 provides for collecting of data indicating traffic and road conditions, developing traffic messages from the collected data, and transmitting the traffic messages 22 to the vehicles 16 and non-vehicles 18 in the region 10 on a regular and continuing basis. The traffic information broadcast system 20 includes the central facility 26 that develops traffic messages 22. The central facility 26 includes suitable equipment and programming 26(2) for developing the traffic messages 22 as illustrated in FIG. 3. The suitable equipment and programming 26(2) for developing the traffic messages 22 is a combination of hardware and software components. In one embodiment, the central facility 26 includes a computing platform 70, such as a personal computer, having a processor 72, RAM 74, user interface 76, communication system 78 and non-volatile storage device 80 for storing a traffic message program 82 that develops the traffic messages 22. An operator may use the user interface 76 to manually enter and edit traffic information. The central facility 26 also includes a geographic database 84 containing geographic data representing the road network 12 of the geographic region 10. In one embodiment, the geographic database 84 may contain the geographic data published by Navigation Technologies of Chicago, Ill.

Figure 4:
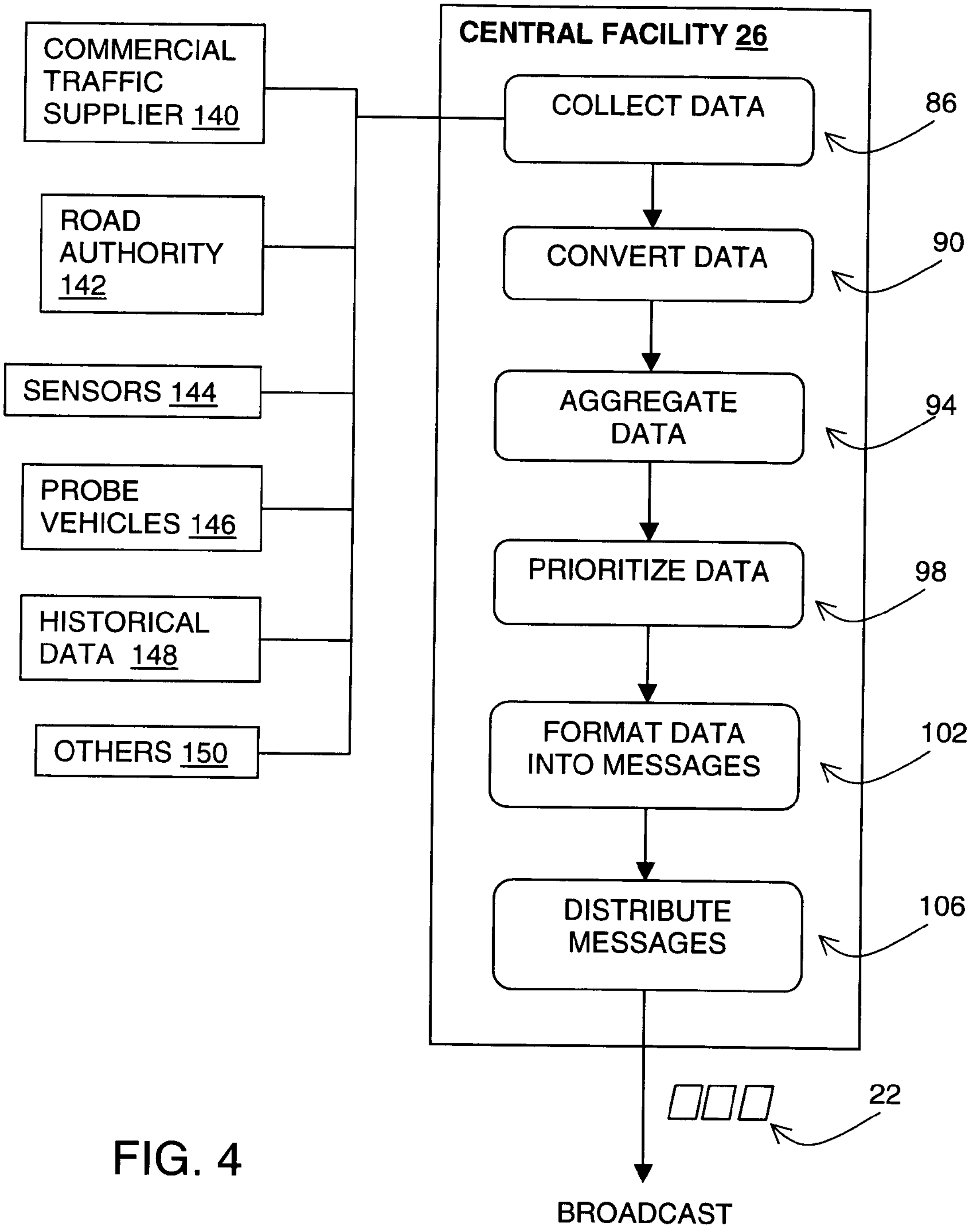
FIG. 4 is a flow chart illustrating the steps performed by the central facility illustrated in FIG. 3.

FIG. 4 illustrates the steps performed by the traffic message program 82 of the central facility 26 to develop the traffic messages 22. At step 86, the central facility 26 collects traffic and road condition data from a variety of sources with a collection subprogram 88. Because the central facility 26 may collect traffic and road condition data from a variety of sources, the collected traffic and road condition data may be in a variety of forms. Thus, at step 90, the central facility 26 converts the collected data into a unified data format representing traffic and road conditions at identified locations along the road network 12 with a conversion subprogram 92. In one embodiment, the central facility 26 converts the collected data into a set of traffic flow data and a set of traffic incident data, as described more fully below in conjunction with FIG. 6.

Because the traffic flow data may contain indications of traffic flow speeds at many identified locations along the same road or connected road segments 14 of the road network 12, at step 94, the central facility 26 aggregates traffic flow data representing contiguous locations having below normal flow conditions with an aggregation subprogram 96 into a set of aggregated traffic flow data, as described more fully below in conjunction with FIGS. 7 and 8. The aggregated traffic flow data provides a model of the traffic flow conditions as would be perceived by a driver traveling along the road.

Figure 9:
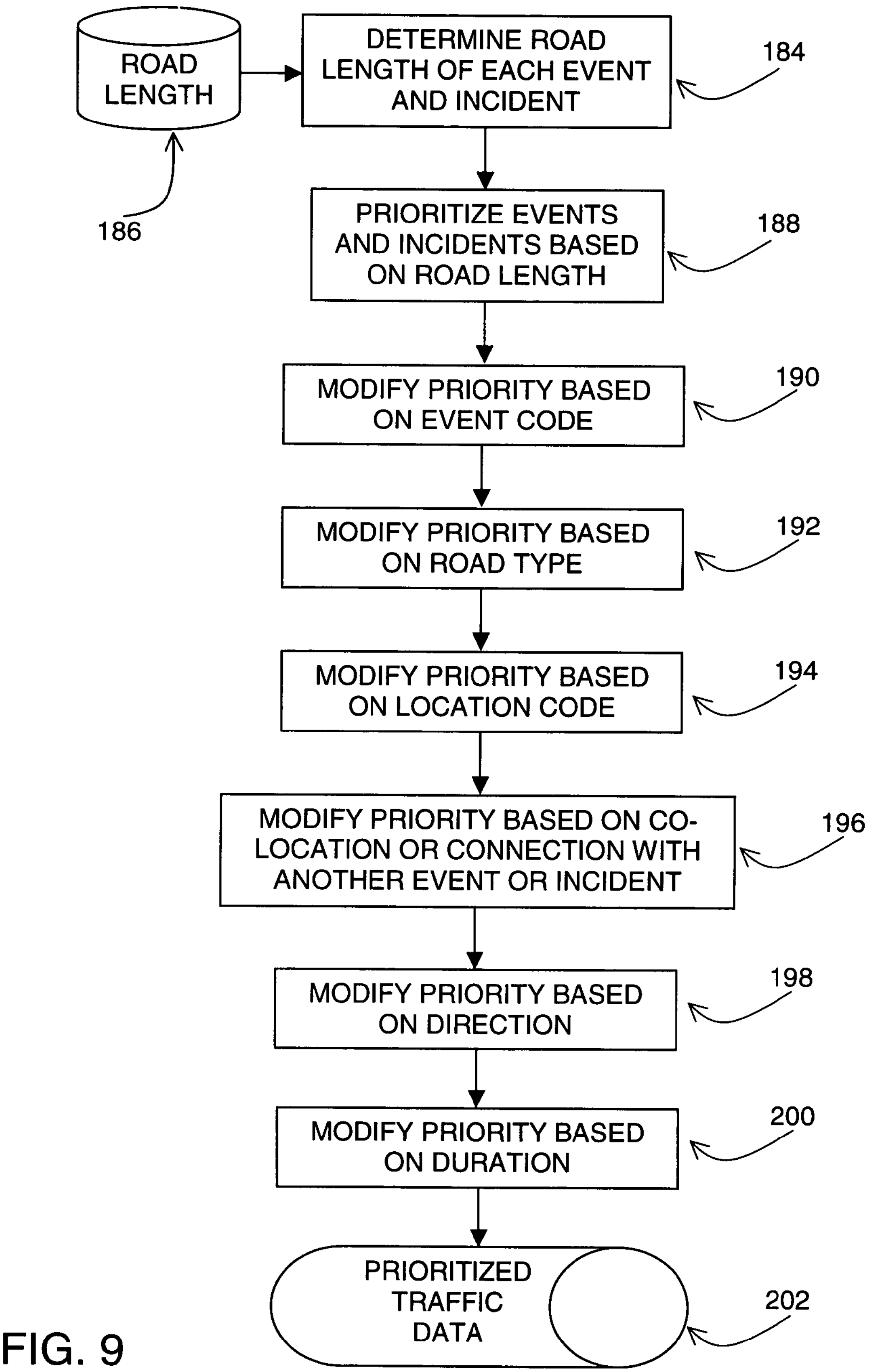
FIG. 9 is a flow chart of the steps performed by the central facility to prioritize the traffic and road condition data.

Because only a limited number of traffic messages may be broadcasted or handled by the navigation system 30, at step 98, the central facility 26 prioritizes the aggregated traffic flow data and traffic incident data with a prioritization subprogram 100 into a set of prioritized traffic data, as described more fully below in conjunction with FIG. 9.

Figure 10:
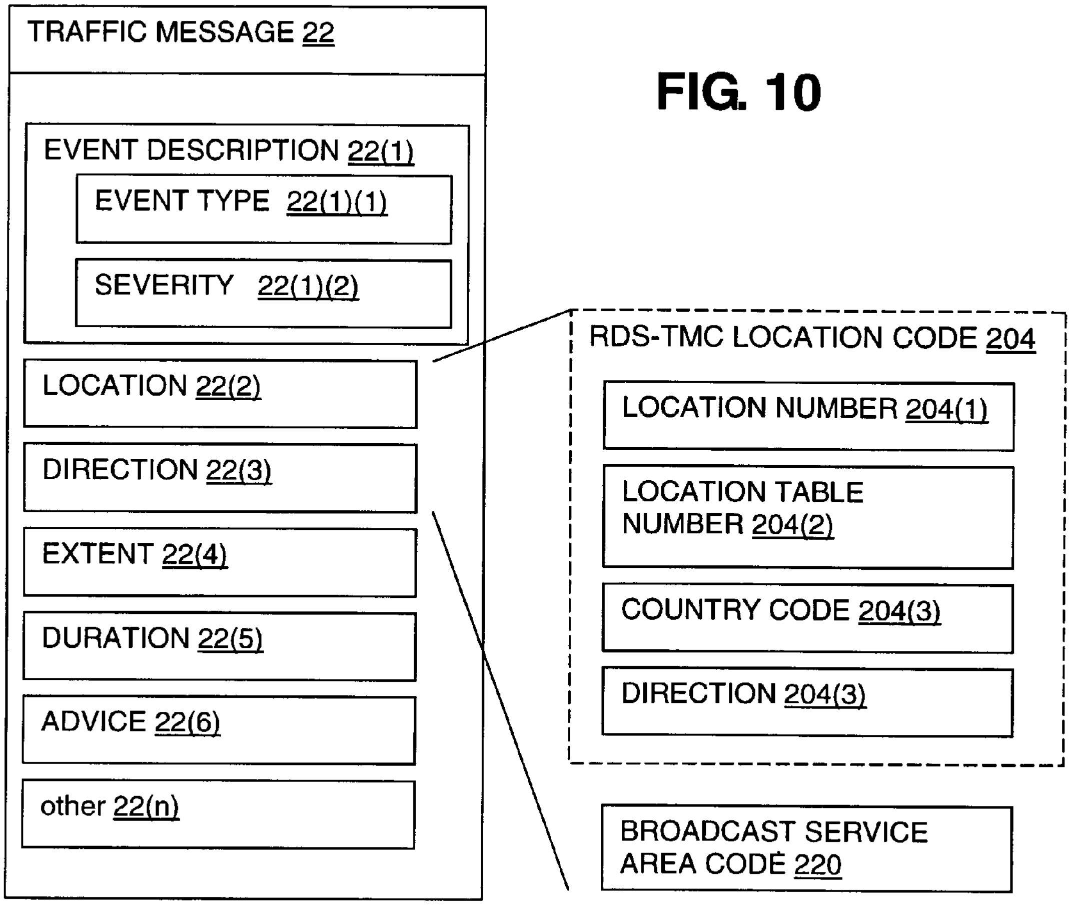
FIG. 10 is a diagram illustrating data components included in one of the traffic messages.

At step 102, the central facility 26 formats the prioritized traffic data into traffic messages 22 with a formatting subprogram 104, as described more fully below in conjunction with FIGS. 10, 11 and 12. After any necessary formatting into traffic messages 22, the central facility 26 distributes the traffic messages 22 for broadcast at step 106 with a distribution subprogram 108, as described more fully below in conjunction with FIGS. 13*a*, 13*b* and 13*c*.

B. Traffic Location Tables

The central facility 26 includes traffic location tables 110 stored on non-volatile storage device 80. The traffic information provider 24 has developed the traffic location tables 110 to identify locations on the road network 12 for which traffic messages 22 may be developed. In one embodiment, the traffic location tables 110 are designed to be consistent with the RDS-TMS protocol.

FIG. 5 illustrates an example of a portion 112 of one of the traffic location tables 110. The traffic location table 112 includes a table identification number ("Table ID") 114 that identifies the table. In one embodiment, the table identification number is a two-digit number, such as 06, uniquely identifying the traffic location table. The traffic location table 112 also includes a location identification code column ("Location ID") 116. In one embodiment, the location identification code is a five-digit number, such as 05529, that uniquely identifies a location on the road network 12.

The traffic location table 112 includes a location type column 118. In one embodiment, locations are of three types: area ("A6"), linear ("L1"), and point ("P1"). Area is a predefined portion of the geographic region 10, such as a partition on a county boundary or metropolitan area, for example "San Diego Metro." Linear ("L1") is a pre-defined section of road or entire road, such as a portion of a highway. Point ("P1") is a pre-defined location along a road, such as a ramp intersection, a road junction, a tollbooth, a bridge/tunnel, a rest area, beginning/end of a road, administrative level or boundary.

The traffic location table 112 also includes a road number column 120. In one embodiment, the road number 120 is an alphanumeric representation of the road number of the road or highway, such as "I-5." Additionally, the traffic location table 112 includes a road name column 122. In one embodiment, the road name 122 is an alphanumeric representation of the road name of the road or highway, such as "Lake Shore Drive."

Furthermore, the traffic location table 112 includes a first name column 124. For area locations, the first name is a name of the area. For linear locations, the first name is the direction of travel toward the negative end of the linear. In one embodiment, linear locations have pre-defined directions with a positive direction from the southernmost point location to the northernmost point location or from the western most point location to the eastern most point location (other directions are also possible). For point locations, the first name is the location name, such as the junction name. The traffic location table 112 also includes a second name column 126. For area locations and point locations, the second name is not populated. For linear locations, the second name is the direction of travel toward the positive end of the linear.

Additionally, the traffic location table 112 includes an area reference column 128. The area reference contains the area identification code in which the linear location and point locations belong. The traffic location table 112 also includes a linear reference column 130. The linear reference contains the linear identification code of which the point locations belong.

Furthermore, the traffic location table 112 includes a negative offset column 132 that contains the location identification code of the previous location. For point locations, the negative offset is the location identification code of the previous point location. As described above, linear locations have pre-defined directions with a positive direction from the southernmost point location to the northernmost point location or from the western most point location to the eastern most point location. Thus, the negative offset is the previous point location in the negative direction. The traffic location table 112 includes a positive offset column 132 that contains the location identification code of the next location. For point locations, the positive offset is the location identification code of the next point location in the positive direction.

Moreover, the traffic location table 112 includes a latitude column 136 and a longitude column 138. For point locations, the latitude and longitude location value for a point at the point location is provided.

In one embodiment, the traffic information provider 24 has location tables 110 for each country. A country code associated with a set of location tables 110 identifies the country represented by the tables.

FIG. 5 and the above description illustrate one example of the traffic location tables 110. In alternative embodiments, the traffic location table 110 may include different elements or columns. Additionally, the traffic location table may have different formats than illustrated in FIG. 5.

C. Data Collection

As illustrated in FIG. 4, the central facility 26 collects traffic and road condition data from a variety of sources at step 86. Generally, the collected traffic data comprises a location description and an event description of a traffic or road condition. The location description identifies a location or locations along the road network affected by the traffic or road condition. The event description identifies a type of traffic or road condition. The collected traffic data may also include a duration description. The duration description identifies when the traffic or road condition is expected to return to normal or change.

In one embodiment, the central facility 26 may receive traffic and road condition data from a commercial traffic supplier 140. The commercial traffic supplier 140 may provide traffic data indicating incidents, such as accidents, on the road network 12 in the geographic region 10. Additionally, the commercial traffic supplier 140 may provide traffic data indicating traffic speeds associated with certain locations on road network 12.

In one embodiment, the central facility 26 receives traffic data from the commercial traffic supplier 140 representing traffic speeds in a format illustrated in Table I or other formats.

TABLE I

| Code | Direction | 2:00 | 2:15 | 2:30 | 2:45 | 3:00 | 3:15 | 3:30 | 3:45 |
|---|---|---|---|---|---|---|---|---|---|
| 1234 | Positive | 50 | 55 | 55 | 50 | 55 | 50 | 50 | 50 |
| 1234 | Negative | 35 | 40 | 40 | 50 | 50 | 40 | 35 | 40 |
| 2345 | Positive | 40 | 35 | 30 | 30 | 35 | 40 | 50 | 55 |
| 2345 | Negative | 50 | 50 | 35 | 35 | 40 | 50 | 50 | 35 |

As shown in Table 1, the data indicating traffic speeds provides a location reference code identifying traffic locations. Location reference codes ("Code") refer to specific locations that are spaced apart from each other along a road. In one embodiment, the location reference codes may correspond to location identification numbers for point locations used in the traffic location table 112. For example, the location reference code includes a country code, a location table identification number and a point location identification code. In an alternative embodiment, the location reference codes do not correspond to the location codes used in the traffic location table 112.

As shown in Table I, the data indicating traffic speeds also provides a direction of traffic flow as either "Positive" or "Negative." The "Positive" direction refers to a predetermined direction along a road specified by a positive offset and specified by the next traffic location code on the road. The "Negative" direction refers to a predetermined direction along a road specified by a negative offset and specified by the previous traffic location code on the road.

The data also includes traffic speeds for the location on the road network 12 identified by the location reference code. As shown in Table I, the commercial traffic supplier 140 provides traffic speeds in fifteen-minute increments of time for each of the listed location reference codes. The speed data indicates the traffic speeds for the past half hour, the current traffic speeds and predicted traffic speeds. For the illustration of Table 1, the time at which the commercial traffic supplier 140 sent the data to the central facility 26 was approximately 2:30. In an alternative embodiment, the commercial traffic supplier 140 may provide congestion levels rather than the traffic speeds. Additionally, in an alternative embodiment, the commercial traffic supplier 140 may provide traffic speeds or congestion levels in different increments of time than the above fifteen-minute increments of time.

In addition to receiving data indicating traffic speeds at locations along the road network 12, the central facility 26 receives traffic data representing traffic incidents from the commercial traffic supplier 140 in a format illustrated in Table II or other formats.

TABLE II

| Start Code | End Code | Start dir | End dir | End time | Event code |
|---|---|---|---|---|---|
| 1234 | 1245 | Positive | Positive | 2:00 Jan. 1, 2003 | 401 |
| 2345 | 2342 | Negative | Negative | 1:00 Jan. 1, 2003 | 141 |

As shown in Table II, the data indicating traffic incidents provides a start location reference code and an end location reference code identifying a beginning location and an ending location of the incident on the road network 12. The start and end location reference codes refer to specific locations that are spaced apart from each other along a road. In one embodiment, the location reference codes may correspond to point location identification codes used in the traffic location table 112. For example, the location reference code includes a country code, a location table identification number and a point location identification code. In an alternative embodiment, the location reference codes do not correspond to the location identification codes used in the traffic location table 112.

As shown in Table II, the data indicating traffic incidents also provides a direction of traffic flow at the beginning and ending location of the incident as either "Positive" or "Negative." The "Positive" direction refers to a predetermined direction along a road specified by a positive offset and specified by the next traffic location code on the road. The "Negative" direction refers to a predetermined direction along a road specified by a negative offset and specified by the previous traffic location code on the road.

The data indicating traffic incidents may include a time and date at which the traffic incident is expected to end and traffic is expected to return to normal conditions. Moreover, the data includes an event code that describes the traffic incident. The event code may conform to a standard format such, as ALERT-C, or code that may be readily mapped to a standard format. For example, the event codes may indicate an accident, lane closures, lane restrictions, traffic restrictions, exit restrictions, carriageway restrictions, road works, obstruction hazards, road conditions, activities, dangerous vehicle and traffic equipment status.

The central facility 26 may also receive traffic and road condition data from a road authority 142, such as the Illinois Department of Transportation or other such organization. The road authority 142 may provide traffic data indicating traffic incidents and road conditions at locations along the road network 12. The traffic incidents and road conditions reported by the road authority may include accidents, delays, traffic backups, traffic congestion, construction activities, lane restrictions, traffic restrictions, exit restrictions, carriageway restrictions, road works, obstruction hazards, road conditions, dangerous vehicle and traffic equipment status or any other information regarding the road network 12. In one embodiment, the central facility 26 receives traffic data representing traffic incidents and road conditions from the road authority 142 in a format illustrated in Table III or other formats.

TABLE III

| Main Road | Start Cross Road | End Cross Road | Direction | Duration | Event Type |
|---|---|---|---|---|---|
| I-5 | Camino De La Plaza | I-805 | South Bound (−) | 2 hours | Left Lane Closed |
| CA-15 | Main St | I-5 | South Bound (−) | 30 minutes | Heavy Congestion |
| I-5 | Camino De La Plaza | Camino De La Plaza | South Bound (−) | 2 hours | Debris on Road |

As shown in Table III, the data indicating traffic incidents and road conditions provide descriptive information, such as a name, number or other description, of a road on which the incident or condition exists ("Main Road"). Additionally, the data includes descriptive information of a cross road or other point along the road at which the incident or condition begins ("Start Cross Road") and descriptive information of a cross road or other point along the road at which the incident or conditions ends ("End Cross Road"). The data also includes a direction of traffic along the road that is affected by the incident or condition. Furthermore, the data includes a duration indicating when the incident or condition will end. Moreover, the data includes a description of the incident or condition. In an alternative embodiment, the data may comprise a textual description, a severity type, a city name, and any other information.

The central facility 26 may also receive traffic and road condition data from sensors 144 located in, near or above locations along the road network 12. The sensors 144 may include equipment and programming, such as various communications links (including wireless links), receivers, data storage devices, programming that save the collected data, programming that logs data collection times and locations, programming that analyzes the data to determine traffic speeds and so on. In one embodiment, the sensors 144 collect data regarding traffic speeds at certain locations along the road network 12. The sensors 76 may include vehicle counting devices, video cameras, radar and any other sensor. In one embodiment, the central facility 26 receives the traffic data from the sensors 144 in a format illustrated in Table IV or other formats.

TABLE IV

| Sensor ID | Location Code | Direction | Speed |
|---|---|---|---|
| 0016 | 6789 | Positive | 35 |
| 0034 | 8912 | Negative | 40 |

As shown in Table IV, the data indicating traffic data provides a sensor identification number and a location reference code. Location reference codes ("Code") refer to specific locations that are spaced apart from each other along a road. In one embodiment, the location reference codes may correspond to point location identification codes used in the traffic location table 112. For example, the location reference code includes a country code, a location table identification number and a point location identification code. In an alternative embodiment, the location reference codes do not correspond to the location codes used in the traffic location table 112.

As shown in Table IV, the data indicating traffic speeds also provides a direction of traffic flow as either "Positive"

or "Negative." The "Positive" direction refers to a predetermined direction along a road specified by a positive offset and specified by the next traffic location code on the road. The "Negative" direction refers to a predetermined direction along a road specified by a negative offset and specified by the previous traffic location code on the road. The data from the sensors 144 also includes current traffic speeds for the location on the road network 12 identified by the location reference code.

The central facility 26 may also receive traffic and road condition data from probe vehicles 146 traveling along the road network 12. A probe vehicle 146 is a vehicle that collects road-related data while it is being used for purposes unrelated to the collection of road-related data. For example, a probe vehicle is operated for ordinary, everyday purposes, such as commuting, leisure or business. A member of the public may operate the probe vehicle or alternatively a commercial enterprise or government entity may operate the probe vehicle. Each of the probe vehicles 146 may wirelessly communicate with the central facility 26 to provide data indicating a location of the vehicle and a speed. Analyzing data from numerous probe vehicles traveling the road network 12 provides an indication of traffic conditions on the road network 12. In one embodiment, the central facility 26 receives traffic data from the probe vehicles 78 in a format illustrated by Table V or other formats.

TABLE V

| Vehicle ID | Latitude | Longitude | Heading | Speed |
|---|---|---|---|---|
| 9877 | 003268936 | −11711635 | North | 35 |
| 8766 | 003254417 | −11703531 | South | 40 |

As shown in Table V, the data from the probe vehicles 146 provides a probe vehicle identification number uniquely identifying the probe vehicle 146. Additionally, the data includes a latitude and longitude indicating the current position of the probe vehicle 146, such as from a GPS system. The data also includes a heading and a current speed. To provide an indication of traffic conditions on the road network 12, the central facility 26 groups and statistically analyzes the data from numerous probe vehicles.

The central facility 26 may also receive traffic and road condition data from historical data 148. Historical data 148 provides travel speeds for locations along the road network 12 at various time intervals based on past traffic patterns. Historical data 148 may be based on analysis of traffic data collected over time from the commercial traffic supplier 140, the road authority 142, the sensors 144, the probe vehicles 146 or any other source. The analysis of the traffic data collected over time may illustrate repeating patterns of travel speeds at certain times of the day and days of the week for certain road segments. For example, on weekdays between 7 A.M. and 9 A.M., a certain highway experiences moderate congestion. Furthermore, the commercial traffic supplier 72 may provide a model of likely traffic conditions at various times, such as traffic conditions near a sporting area after a sporting event.

In one embodiment, the central facility 26 receives traffic data from the historical data 148 in a format illustrated in Table VI or other formats.

TABLE VI

| Code | Direction | 12:00 | 12:15 | 12:30 | 12:45 | 1:00 | 1:15 | 1:30 | 1:45 |
|---|---|---|---|---|---|---|---|---|---|
| 7234 | Positive | 50 | 55 | 55 | 50 | 55 | 50 | 50 | 50 |
| 7234 | Negative | 35 | 40 | 40 | 50 | 50 | 40 | 35 | 40 |
| 8345 | Positive | 40 | 35 | 30 | 30 | 35 | 40 | 50 | 55 |
| 8345 | Negative | 50 | 50 | 35 | 35 | 40 | 50 | 50 | 35 |

As shown in Table VI, the data provides a location reference code identifying traffic locations. Location reference codes ("Code") refer to specific locations that are spaced apart from each other along a road. In one embodiment, the location reference codes may correspond to point location identification codes used in the traffic location table 112. For example, the location reference code includes a country code, a location table identification number and a point location identification code. In an alternative embodiment, the location reference codes do not correspond to the location codes used in the traffic location table 112.

As shown in Table VI, the data indicating traffic speeds also provides a direction of traffic flow as either "Positive" or "Negative." The "Positive" direction refers to a predetermined direction along a road specified by a positive offset and specified by the next traffic location code on the road. The "Negative" direction refers to a predetermined direction along a road specified by a negative offset and specified by the previous traffic location code on the road.

The data also includes traffic speeds for the location on the road network 12 identified by the location reference code. The historical data 148 provides traffic speeds in fifteen-minute increments of time for each of the listed location reference codes or in another increments of time. The speed data indicates the traffic speeds for the past half hour, the current traffic speeds and predicted traffic speeds. For the illustration of Table VI, the time at which the historical data 148 was supplied to the central facility 26 was approximately 12:30.

The central facility 26 may also receive traffic and road condition data from other sources 150. Other sources include police reports, accident reports, commercial media traffic reports, helicopter observations, individuals and any other source. The data from these other sources 150 may take a variety of formats including a format similar to that described above in conjunction with the road authority 142, text descriptions, or any other format. Additionally, an operator at the central facility 26 may manually enter and edit the traffic and road condition data with the user interface 76.

The central facility 26 receives the traffic and road condition data from the variety of sources through a variety of communication links including wireless communication links, direct communication links, and the Internet. The central facility 26 receives the traffic and road condition data from the variety of sources at various time intervals. For example, the central facility 26 may automatically receive data every five minutes or any other interval from the different sources. Additionally, the central facility 26 may request traffic and road condition data from the sources when needed. In one embodiment, the central facility 26 time and date stamps all received data records from each of the sources.

The traffic and road condition data received by the central facility 26 may have a variety of different formats. In one embodiment, the commercial traffic supplier 140 provides a complete replacement set of traffic data every established time interval. In another embodiment, the commercial traffic supplier 140 provides an incremental update of traffic data indicating additions, deletions and changes to previously supplied traffic data. Furthermore, the commercial traffic supplier 140 may provide data indicating a current status of traffic flow and/or a forecast of future traffic conditions. The above data formats for the collected traffic and road condition data illustrate some of the possible data formats. In alternative embodiments, the collected traffic and road condition data may have a variety of different formats than illustrated above.

D. Data Conversion

Figure 6:
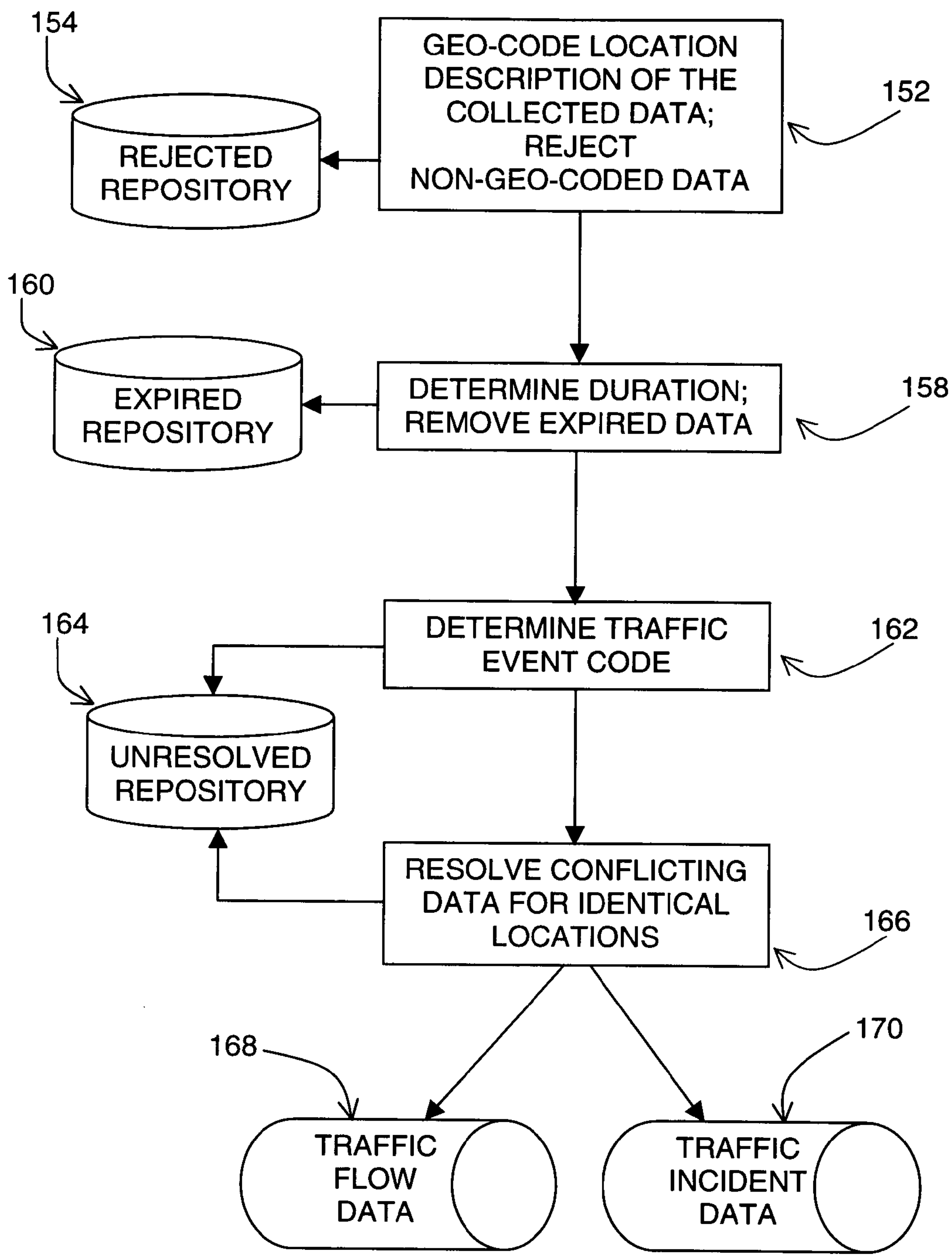
FIG. 6 is a flow chart of the steps performed by the central facility to resolve the collected traffic and road condition data.

Because the central facility 26 may collect traffic and road condition data from a variety of sources, the traffic and road condition data including the location description, event description and/or duration description of the traffic or road condition may be in a variety of forms. Thus, at step 90 of FIG. 4, the central facility 26 converts the collected data of the location description, event description and/or duration description into a unified format with the conversion subprogram 92. FIG. 6 illustrates the steps performed by the central facility 26 to convert the collected data into a set of traffic flow data and a set of traffic incident data.

Referring to FIG. 6, at step 152, the central facility 26 geo-codes the location description of the collected data and rejects any data that cannot be geo-coded. The central facility 26 places the data that cannot be geo-coded in a rejected repository 154. To geo-code the collected data, the central facility 26 identifies the location on the road network 12 indicated by the location description of collected data. In one embodiment, the central facility 26 converts the location description into the point location identification code(s) 116 of the traffic location table 110 that corresponds with the location indicated by the location description of the collected data. Additionally, the central facility 26 identifies a direction corresponding with the location description as either positive or negative.

For the traffic and road condition data sources that provide the location descriptions using location reference codes and directions that correspond with the location identification codes and directions of the traffic location table 110, the central facility 26 does not have to geo-code the data. Rather, the central facility 26 verifies that each location reference code matches with a point location identification code in the traffic location table 12. Additionally, the central facility 26 verifies that the direction identified in the collected data matches with a direction in the traffic location table 12 corresponding to the identified point location identification code. If the location reference code and direction of the collected data match with one of the point location identification codes and directions of the traffic location table 110, the central facility 26 passes the data to step 158. If the location reference code and direction of the collected data do not match with one of the point location identification codes and directions of the traffic location table 110, the central facility 26 stores the data in the rejected repository 154.

For the traffic and road condition data sources that that provide the location descriptions using location reference codes and directions that do not correspond with the location identification codes and directions used in the traffic location table 110, the central facility 26 geo-codes the data with a conversion table 156 (or other suitable data structure). The conversion table 156 converts the location reference codes and directions assigned by the data supplier, such as the commercial traffic supplier 140, into point location identification codes and directions of the traffic location table 110. A method for forming the conversion table is disclosed in U.S. patent application Ser. No. 10/123,587, entitled "METHOD AND SYSTEM FOR USING REAL-TIME TRAFFIC BROADCASTS WITH NAVIGATION SYSTEMS", the entire disclosure of which is incorporated by reference herein. U.S. patent application Ser. No. 10/123,587 discloses a method and system in which a data structure is formed that relates a set of location reference codes assigned to locations along roads by a first data supplier to another set of location reference codes assigned to locations along roads by a second data supplier. If the conversion table 156 provides a match between the location reference code and direction of the collected data with one of the point location identification codes and directions of the traffic location table 110, the central facility 26 assigns the matched point location identification code and direction to the data and passes the data to step 158. If the conversion table does not provide a match between the location reference code and direction of the collected data match with point location identification code and direction of the traffic location table 110, the central facility 26 stores the data in the rejected repository 154.

The traffic and road condition data sources may provide location descriptions using descriptive information, such as a text description, a name, number, an alphanumeric description or other descriptions. For example, the location description may provide an address, a landmark, point of interest or any other information indicating a position on the road network. Additionally, the location description may provide a main road on which the traffic condition exists and a crossroad, landmark, point of interest or any other information proximate the traffic condition on the main road. Additionally, the location description may provide a main road on which the traffic condition exists, a start description indicating the beginning the of traffic condition on the main road and an end description indicating the end of the traffic condition. The start description may provide a crossroad, address, landmark, point of interest or any other information proximate the beginning of the traffic condition on the main road, and the end description may provide a crossroad, address, landmark, point of interest or any other information proximate the end of the traffic condition on the main road or a distance from the beginning of the traffic condition.

In one embodiment, the central facility 26 geo-codes the location description of the collected data by matching the descriptive information to the point location identification codes and directions in the traffic location table 12. For the example of data provided by the road authority 142 illustrated in the first row of Table m, the central facility 26 identifies the main road name from the collected data ("I-5") and determines whether the main road name matches a road number 120 or road name 122 associated with one of the linear location identification codes in the traffic location table 110. For the example of "I-5," the central facility 26 determines that the corresponding linear location identification code is "00111." Next, the central facility 26 identifies the start cross road name from the collected data ("Camino De La Plaza") and determines whether the start cross road name matches a first name 124 of one of the point location identification codes associated with the identified linear location code. For the example of "Camino De La Plaza," point location identification code "04966" on linear location identification code "0111" has the first name 124 of "Camino De La Plaza." Next, the central facility 26 identifies the end cross road name from the collected data ("I-805") and determines whether the end cross road name matches a first name 124 of one of the point location identification codes associated with the identified linear location code. For the example of "I-805," point location identification code "04967" on linear location identification code "0111" has the first name 124 of "I-805." Thus, the central facility 26 identified the point location identification codes corresponding to the location description of the collected data.

The central facility 26 may also determine the direction from the descriptive information by determining whether the point location identification code associated with the end cross road name is negatively offset 132 or positively offset 134 from point location identification code associated with the start cross road name. For this example, the direction is positive. The central facility 26 may also determine the direction by comparing the direction data "South Bound" from the road authority 142 to the first name 124 and second name 126 associated with the identified linear location identification code. If the road names and direction of the collected data match with one of the point location identification codes and directions of the traffic location table 110 as described above, the central facility 26 assigns the matched point location identification codes and direction to the data and passes the data to step 158. If the road names of the collected data do not match with one of the point location identification codes and directions of the traffic location table 110, the central facility 26 stores the data in the rejected repository 154.

In one embodiment, the central facility 26 converts the descriptive information of the location description of the collected data into a point location identification code of the start of the traffic incident and an extent of a number of contiguous point location identification codes affected in a direction from the start of the traffic incident. In another embodiment, the central facility 26 converts the descriptive information of the location description of the collected data into a point location identification code of the start of the traffic incident and a point location identification code of the end of the traffic incident.

In an alternative embodiment, the central facility 26 geo-codes the location description in terms of descriptive information using the geographic database 84. The central facility identifies road segments and/or nodes of the geographic database 84 that match the descriptive information. For example, the location description that provides the address, landmark, point of interest or any other information indicating a position on the road network may be geo-coded with the geographic database 84 to identify the position on the road network. Once the location description has been geo-coded with the geographic database 84, the central facility 26 converts identified position on the road network to the point location identification codes and directions in the traffic location table 12.

For the traffic and road condition data sources that provide the location descriptions using latitude, longitude and heading, such as the plurality of probe vehicles 146, the central facility 26 geo-codes the location description of the collected data by matching the latitude, longitude and heading to one of the point location identification codes and directions in the traffic location table 110. For the example of data provided by the probe vehicles 146 illustrated in the first row of Table V, the central facility 26 identifies the point location identification code having latitude 136 and longitude 138 matching or close to the latitude and longitude of the collected data. For this example with collected data having latitude "03268936" and longitude "−11711635" matches with point location identification code 00529. The central facility 26 then identifies the direction by comparing the heading to the first name 124 or second name 126 associated with the linear location identification code of which the point location identification code belong. For the present example, the heading "North" corresponds to "Positive" direction.

Alternatively, the central facility 26 geo-codes the latitude, longitude and heading into one of the point location identification codes and directions in the traffic location table 110 by performing a map matching algorithm that identifies a main road corresponding to the latitude and longitude data. After determining the main road corresponding to the latitude and longitude data, the central facility 26 performs a cross road search algorithm that identifies a cross road near the latitude and longitude position. The map matching algorithm and cross road search algorithm use the geographic database 84 and may be any map matching algorithm and cross road search algorithm known to one skilled in the art. Once the main road and cross road are identified, the central facility identifies the point location identification code and direction in the manner described above with respect to the collected data supplied by the road authority 142. If the latitude, longitude and heading of the collected data match with one of the point location identification codes and directions of the traffic location table 110 as described above, the central facility 26 assigns the matched point location identification code and direction to the data and passes the data to step 158. If the latitude, longitude and heading of the collected data do not match with one of the point location identification codes and directions of the traffic location table 110, the central facility 26 stores the data in the rejected repository 154.

In an alternative embodiment, the central facility 26 geo-codes the location description in terms of latitude, longitude and heading using the geographic database 84. The central facility identifies road segments and/or nodes of the geographic database 84 that match the latitude, longitude and heading. Once the location description has been geo-coded with the geographic database 84, the central facility 26 converts identified road segments and/or nodes of the geographic database 84 to the point location identification codes and directions in the traffic location table 12.

In one embodiment, an operator at the central facility 26 may review the collected data placed in the rejected repository 154 to manually geo-code the data and pass the data to step 158.

After the collected data has been geo-coded, the central facility 26 determines the duration or end time from the duration description of the collected data and rejects any data that has expired at step 158. The central facility 26 converts the duration description of the collected data into a duration code or end time at which the traffic is expected to return to normal conditions. In one embodiment, the central facility 26 converts the duration description into the duration code or end time using a conversion table or other appropriate data structure or mathematical conversion. Once the central facility 26 has converted the duration description into the duration code or end time, the central facility determines whether the collected data has a duration code or end time that has expired. The central facility 26 places the data that has expired in an expired repository 160. If the data has not expired, the central facility 26 passes the data to step 162.

In another embodiment, the central facility 26 identifies data records whose time stamp as been exceeded by a predetermined amount of time and removes the data to the expired repository 158. The value of the predetermined amount of time may vary depending on the source of the collected data. For example, data from the sensors 144 and probe vehicles 146 will expire sooner than collected data from the road authority 144.

In one embodiment, the operator may review the expired data placed in the expired repository 160 to determine whether any of the data should not be classified as expired and may pass the data records to step 162.

At step 162, the central facility 26 determines an event type from the event description of the collected data. For the collected data that provide speed information, such as collected data from the sensors 144, probe vehicles 146, historical data 148 and commercial traffic supplier 140, the central facility 26 determines that the event type is congestion information that will eventually be stored in a traffic flow data repository 168. For the collected data providing traffic incident information, such as the road authority 142 and commercial traffic supplier 140, the central facility 26 converts the event code, event type or event descriptive information of the collected data into a traffic event code. In one embodiment, the central facility 26 converts the event description into the traffic event code using a conversion table or other appropriate data structure. In one embodiment, the traffic event codes are three-digit numbers associated with specific traffic incidents and road conditions including accidents, delays, traffic backups, construction activities, lane restrictions, traffic restrictions, exit restrictions, carriageway restrictions, road works, obstruction hazards, road conditions, dangerous vehicle and traffic equipment status or any other information regarding the road network 12. The traffic event codes may correspond exactly with the event codes established by the ALERT-C protocol.

For the traffic and road condition data sources that use event codes, such as the commercial traffic supplier 140, the central facility determines the traffic event code by matching the supplied event code to a traffic event code. If the commercial traffic supplier 140 uses identical event codes as traffic event codes, the central facility 26 verifies that the event code matches with a traffic event code. If the commercial traffic supplier 140 uses event codes different from the traffic event codes, the central facility 26 uses the conversion table to convert the supplied event code into a traffic event code. For the collected data from the road authority, the central facility 26 uses the conversion table matching the textual descriptions of the event type to the proper traffic event code.

If the event code, event type or event descriptive information of the collected data match with a traffic event code, the central facility 26 assigns the matched traffic event code to the data and passes the data to step 166. If the event code, event type or event descriptive information of the collected data do not match with the traffic event codes, the central facility 26 stores the data in the unresolved repository 164.

In one embodiment, the operator may review the data records placed in the unresolved repository 164 to determine the appropriate traffic event code and may pass the data records to step 164.

At step 164, the central facility 26 resolves any conflicting and/or duplicate data for identical locations along the road network 12. Because the central facility 26 receives traffic and road condition data from a variety of sources, several data records may provide traffic information for the identical location as indicated by the point location identification codes. In one embodiment, the central facility identifies data having identical point location identification codes.

If the data having identical point location identification codes provide speed information, the central facility 26 compares the speed information to determine if the information is similar or conflicting. If the difference between current speed values from different data for the same point location identification code is within a predetermined amount, the central facility 26 identifies the data as duplicates. For duplicate data records, the central facility 26 stores the data record with the most current (time-base) data in the resolved traffic flow data repository 168 and stores the data with the less current data in the unresolved repository 164. If the difference between traffic speed values is not within the predetermined amount, the central facility 26 identifies the data as conflicting. For conflicting data, the central facility 26 analyzes the data to determine which data most likely represents the actual traffic speed of the identified location. In one embodiment, the central facility 26 chooses the data record of the data sources that ranks highest on a quality list developed by the central facility 26. The quality list may be developed based on studies of the various data sources to determine which source provides the most accurate traffic. For example, the quality list may rank the commercial traffic provider 140 first, road authority 142 second, sensors 144 third, probe vehicles 146 fourth, historical data 148 fifth and other sources 150 last. The central facility 26 stores the data from the highest ranked source in the resolved traffic flow data repository 168 and stores the other conflicting data in the unresolved repository 164. In another embodiment, the central facility 26 chooses the data based on a consideration of both the quality rank and the time age associated with the data. In yet another embodiment, the operator may review the conflicting and/or duplicate data and investigate which data record should be stored in the resolved traffic flow data repository 168.

After the central facility 26 has converted the collected data follow the steps of FIG. 6, the traffic incident data stored in the resolved traffic incident data repository 170 have a unified format. Each data record representing a traffic incident includes components of event type code, start location code, direction, extent and end time or duration as shown below:

| Event Code | Location Code | Direction | Extent | End Time - Duration | |
|---|---|---|---|---|---|
| 401 | 04967 | Positive | 1 | 4:30 | 2 hours |

Similarly, the traffic flow data stored in the resolved traffic flow data repository 168 have a unified format. Each data record representing traffic flow includes components of location code, direction, speed(s) and end time or duration. For example, the example illustrated below with Table VIII shows data records representing traffic flow.

The above description for resolving the collected data illustrates some of the possible methods for geo-coding, determining duration and event codes, resolving conflicting and duplicate data into a unified format. In alternative embodiments, other methods for geo-coding, determining duration and event codes, resolving conflicting and duplicate data into a unified format may be used. Additionally, the unified format for the traffic incident data and unified format for the traffic flow data may have a variety of different formats than illustrated above.

E. Data Aggregation

The resolved traffic flow data repository 166 contains data representing the traffic speed at numerous identified locations along the same road or connected road segments 14 of the road network 12 of the geographic region 10. At step 94 of FIG. 4, the central facility 26 aggregates data representing contiguous locations have related speed conditions with the aggregation subprogram 96. FIG. 7 illustrates the steps performed by the central facility 26 to aggregate data having related speeds.

Figure 7:
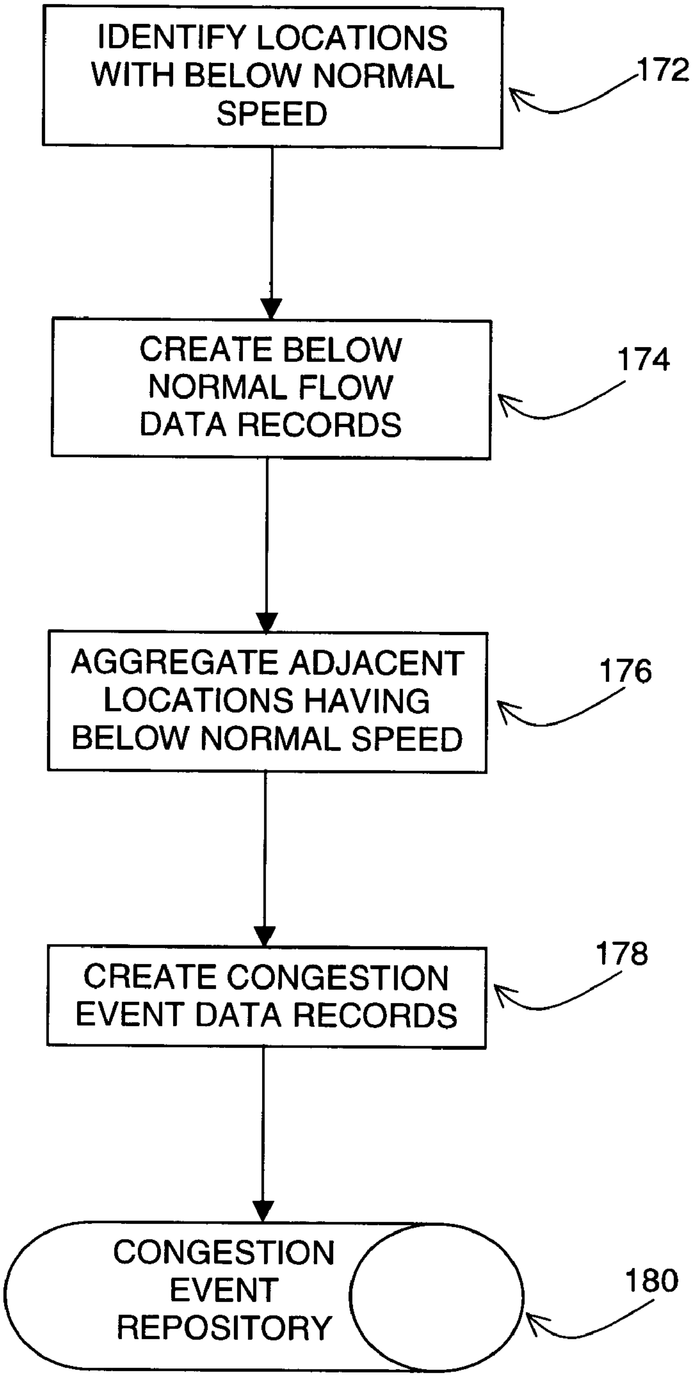
FIG. 7 is a flow chart of the steps performed by the central facility to aggregate the traffic data.

Referring to FIG. 7, the central facility 26 identifies locations with below normal speed at step 172. The central facility 26 evaluates the data stored in the resolved traffic flow repository 168 to identify the locations along the road network 12 having a current speed below a predetermined normal traffic flow speed. In one embodiment, the central facility 26 compares the current speed value associated with each identified location to a return to normal speed value associated with the identified location. If the current speed is less than the return to normal speed value, the central facility 26 identifies the location as having a current speed below the predetermined normal traffic flow speed. Each linear location, and thus each point location, of the traffic location table 110 is assigned a speed category. Each speed category has a return to normal speed value. Table VII illustrates an example of speed categories and their respective return to normal speed values.

TABLE VII

| Speed Category | Range in MPH | Return To Normal Value |
|---|---|---|
| 1 | >80 | 70 |
| 2 | 65–80 | 60 |
| 3 | 44–64 | 55 |
| 4 | 41–54 | 50 |
| 5 | 31–40 | 35 |
| 6 | 21–30 | 25 |
| 7 | 6–20 | 10 |
| 8 | <6 | 5 |

As shown in Table VII, each speed category has a normal range of speeds and an assigned return to normal speed value. For a road (linear locations and point locations of the traffic location table 110 on that road) having a speed category 4, the normal range of speeds is between 41 and 54 miles per hour and the return to normal speed value is 50 mile per hour. In one embodiment, the central facility 26 may override the speed category and return to normal speed value assigned to a point location. For example, if the point location corresponds with a curve on a speed category 2 linear location, the central facility 26 may override the return to normal speed value of 60 to a speed value more representative of expected speeds at the curve, such as 45 mile per hour. Additionally, the central facility 26 may assign a specific return to normal speed value to specific point locations. For example, if the point location corresponds with a tollbooth on a speed category 2 linear location, the central facility 26 may assign the return to normal speed value of more representative of expected speeds at the tollbooth, such as 15 mile per hour.

Table VIII illustrates data from the resolved traffic flow repository 168. For the example in Table VIII, the current time is 2:30, the speed category of the identified locations indicated by point location identification codes is 4 and the return to normal speed value is 50 mile per hour. The central facility 26 evaluates the speed data for the identified locations and identifies the locations having a current speed below the return to normal speed value of 50 mile per hour. Additionally, the central facility identifies whether the current traffic flow speed for the identified location will remain below the return to normal speed value for future time intervals. For the data shown in Table VIII, the central facility 26 will identify the bold items in the data as being below the return to normal speed value of 50.

TABLE VIII

| Code | Direction | 2:00 | 2:15 | 2:30 | 2:45 | 3:00 | 3:15 | 3:30 | 3:45 |
|---|---|---|---|---|---|---|---|---|---|
| 01234 | Positive | 50 | 55 | 55 | 50 | 55 | 50 | 50 | 50 |
| 01234 | Negative | 35 | 40 | **40** | 50 | 50 | 40 | 35 | 40 |
| 02345 | Positive | 40 | 35 | **30** | **30** | **35** | **40** | 50 | 55 |
| 02345 | Negative | 50 | 50 | **35** | **35** | **40** | 50 | 50 | 35 |
| 03456 | Positive | 55 | 55 | 55 | 50 | 35 | 40 | 50 | 55 |
| 03456 | Negative | 50 | 50 | **35** | **35** | 50 | 50 | 50 | 35 |

After identifying the data having current traffic flow speeds below the return to normal speed value, the central facility 26 creates below normal flow data records from the identified data at step 174. The below normal flow data record includes components of point location identification code, direction, current speed and end time for the traffic flow speed to return to normal. Table IX illustrates the below normal traffic flow data records created by the central facility from the data records of Table VIII. The below normal traffic flow data records contain components identifying the traffic location reference code, direction, current speed and end time for the traffic flow speed to return to normal.

TABLE IX

| Code | Direction | Current Speed | End Time |
|---|---|---|---|
| 01234 | Negative | 40 | 2:45 |
| 02345 | Positive | 30 | 3:30 |
| 02345 | Negative | 35 | 3:15 |
| 03456 | Negative | 35 | 3:00 |

Referring to FIG. 7, the central facility 26 aggregates adjacent point locations having below normal speeds into a single traffic congestion event at step 176. In one embodiment, the central facility 26 evaluates each point location along a linear location of the traffic location table 110 and aggregates adjacent point locations along the linear location that have current speeds within a predetermined range into a single congestion event. As described above, each linear location of the traffic location table 110 is a predefined portion of the road network 12 and may comprise several connected road segments 14. For example, the linear location may be an important road or highway, such as Lake Shore Drive or I-5.

To aggregate the point locations of the linear location having current speeds within a predetermined range, the central facility 26 evaluates the linear location from end to end, first in the positive direction and then in the negative direction. Point locations will be aggregated into a single event if the point locations are contiguous on the same linear location. Additionally, the central facility 26 will aggregate one point location with another contiguous point location if the speed associated with the point location is within a threshold value, such as 5, of the average of the speeds of aggregated point locations. In one embodiment, the central facility 26 will not aggregate point locations if the point location has a current speed that is more than the threshold value from the average of the aggregated point locations. In one embodiment, the central facility 26 will aggregate contiguous point locations even if the point locations belong to different linear locations. In an alternative embodiment, the central facility 26 will not aggregate point locations if the point locations belong to different linear locations. In another embodiment, the central facility 26 will aggregate contiguous point locations that have current speeds that fall within the same level of congestion range of traffic speeds.

Figure 8:
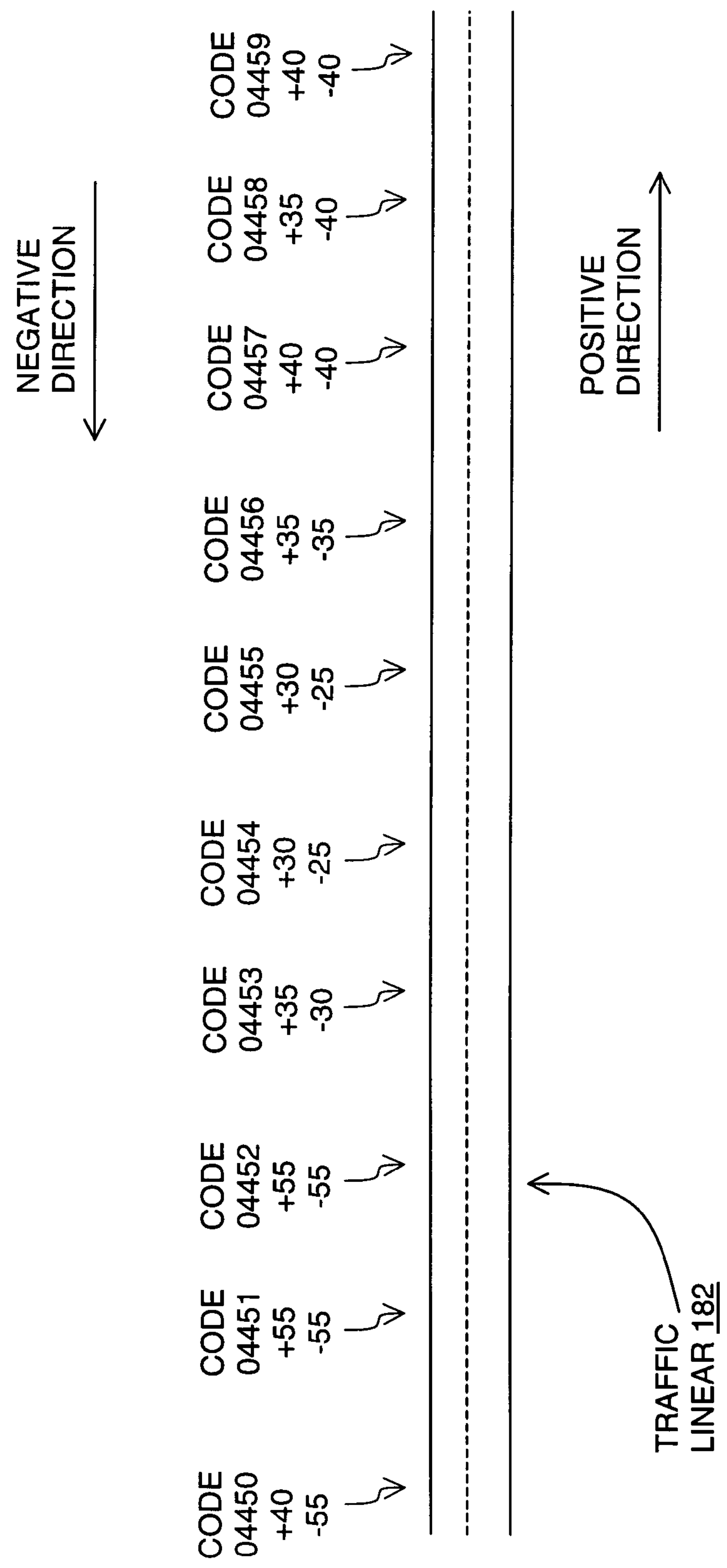
FIG. 8 is a diagram illustrating a road with traffic location codes and corresponding speed data.

FIG. 8 illustrates a traffic linear 182 comprising point location identification codes 04450 through 04459. The current speed for the locations in the positive direction and negative direction are also provided in the FIG. 8. For location 04451, the speed in the positive direction is 35 and the speed in the negative direction is 40. The below normal traffic flow data records for the traffic linear 182 are listed in Table X.

TABLE X

| Code | Direction | Current Speed | End Time |
|---|---|---|---|
| 04450 | Positive | 40 | 2:45 |
| 04453 | Positive | 35 | 3:15 |
| 04453 | Negative | 30 | 3:00 |
| 04454 | Positive | 30 | 3:15 |
| 04454 | Negative | 25 | 3:00 |
| 04455 | Positive | 30 | 2:45 |
| 04455 | Negative | 25 | 3:30 |
| 04456 | Positive | 35 | 3:15 |
| 04456 | Negative | 35 | 3:00 |
| 04457 | Positive | 40 | 2:45 |
| 04457 | Negative | 40 | 3:30 |
| 04458 | Positive | 35 | 3:15 |
| 04458 | Negative | 40 | 3:00 |
| 04459 | Positive | 40 | 2:45 |
| 04459 | Negative | 40 | 3:30 |

For the example shown in FIG. 8 and Table X, the central facility 26 begins the aggregation process for the positive direction of the traffic linear 182 with point location 04459. The central facility 26 compares the speed for the positive direction of point location 04459 to the speed for the positive direction of point location 04458 to determine if the speeds are with a threshold value, such as 5. The speed for the positive direction of point location 04458 is 40, the speed for the positive direction for point location 04458 is 35, thus the two point locations have related speeds, and the central facility 26 aggregates the two point locations. Next, the central facility 26 compares the average of the associated speeds for the positive direction for point locations 04459 and 04458 of 37.5 to the speed 40 for the positive direction associated with the next contiguous point location 04457. Since the speed for location code 04457 is within the threshold value of 5 from the average of 37.5, the central facility 26 adds point location 04457 to the aggregation. Next, the central facility 26 compares the average of the speeds for the positive direction from point locations 04459, 04458 and 04457 of 38.3 to the speed 35 of point location 04456 for the positive direction. Since the difference between the average and the speed of point location 04456 is within the threshold value, the central facility 26 adds point location 04456 to the aggregation of 04459, 04458 and 04457. Next, the central facility 26 compares the average of the speeds for the positive direction from locations 04459, 04458, 04457 and 04456 of 37.5 to the speed 30 of point location 04455 for the positive direction. Since the difference between the average and the speed of point location 04455 is not within the threshold value, the central facility 26 does not add point location 04455 to the aggregation of 04459, 04458, 04457 and 04456. Thus, the central facility 26 aggregates point locations 04459, 04458, 04457 and 04456 in the positive direction together with an average speed of 37.5.

Continuing along the linear location 182 for the positive direction, the central facility 26 compares the speed of point location 04455 for the positive direction to the speed of point location 04454 for the positive direction to determine if the speeds are with the threshold value. The speed for the positive direction of point location 04455 is 30 and the speed for point location 04454 for the positive direction is also 30, thus the two point locations have related speeds, and the central facility 26 aggregates the two point locations. Next, the central facility 26 compares the average of the associated speeds for point locations 04455 and 04454 for the positive direction of 30 to the speed for the positive direction associated with the next contiguous point location 04453. Since the difference between the speeds for point location 04453 of 35 is within the threshold value from the average of 30, the central facility 26 adds point location 04453 to the aggregation. Next, the central facility 26 determines that the next contiguous point location 04452 for the positive direction does not have below normal speed, so the point location 04452 is not aggregated with point locations 04455, 04454 and 04453. Thus, the central facility 26 aggregates point locations 04455, 04454 and 04453 in the positive direction together with an average speed of 31.7. Because point locations 04452 and 04451 for the positive direction do not have below normal traffic speeds, the central facility 26 moves to point location 04450 on the linear location 182. Because point location 04450 is the last point location on linear location 182, the central facility 26 does not aggregate point location 04450 with another point location in the positive direction, and the central facility 26 has complete evaluation of the positive direction of linear location 182. In an alternative embodiment, the central facility continues the above aggregation process to evaluate whether to aggregate point location 04450 with the next contiguous point location on the next traffic linear.

Next, the central facility evaluates the current speeds for the linear location 182 for the negative direction starting with point location 04450 and steps through the point locations until reaching the opposite end point location 04459 of the linear location 182. For the negative direction, the central facility 26 aggregates point locations 04453, 04454 and 04455 together with an average speed of 26.7, and the central facility 26 aggregates point locations 04456, 04457, 04458 and 04459 together with an average speed of 38.75.

After the central facility 26 has aggregated contiguous point locations with below normal speeds, the central facility 26 creates congestion event data records comprising the aggregated point locations and a representative speed of the aggregated point locations at step 178. In one embodiment, the representative speed of the aggregated point locations is the average speed of the aggregated point locations. In another embodiment, the representative speed is a weighted average speed of the aggregated point locations based on the road length between contiguous point locations. In another embodiment, the representative speed is a range of speeds of the aggregated point locations.

In one embodiment, the congestion event data records include components of start point location identification code, direction of traffic flow (positive or negative), extent of the congestion as represented by a number of contiguous point location identification codes affected in the direction of flow from the start point location identification code, event type code and end time after which the congestion event is no longer relevant. The central facility 26 stores the congestion event data records in a congestion event repository 180.

To determine the event type code, the central facility 26 compares the average speed for the aggregated point locations to ranges of speed associated with event type codes. For example, Table XI illustrates event type codes with corresponding range of traffic flow speeds.

TABLE XI

| Range of Average Speed | Event Code |
|---|---|
| Average Speed < 9.0 | 70 |
| 9.0 < Average Speed < 15.0 | 71 |
| 15.0 < Average Speed < 22.0 | 72 |
| 22.0 < Average Speed < 28.0 | 73 |
| 28.0 < Average Speed < 35.0 | 74 |
| 35.0 < Average Speed < 43.0 | 75 |
| 43.0 < Average Speed | 76 |

For the congestion event data records, the central facility 26 determines the end time from the earliest end time associated with one of the point locations of the aggregation. In one embodiment, the end time is related to an ALERT-C duration code. Similar to the event type code, a range time corresponds to one of the duration codes. Table XII illustrates the time ranges and corresponding duration codes.

TABLE XII

| Range of Times | Duration Code |
|---|---|
| Duration < 15 minutes | 0 |
| 15 minutes < Duration < 30 minutes | 1 |
| 30 minutes < Duration < 60 minutes | 2 |
| 60 minutes < Duration < 120 minutes | 3 |
| 120 < Duration < 180 minutes | 4 |
| 180 minutes < Duration < 240 minutes | 5 |
| 240 minutes < Duration < 480 minutes | 6 |
| Duration > 480 minutes | 7 |

For the example shown in FIG. 8 and Table X, Table XIII illustrates the congestion event data records formed by the central facility 26 and stored in the congestion event repository 180. The aggregated traffic flow data represented by the congested event data records provide a model of the traffic flow conditions as would be perceived by a driver traveling the road representing by linear location 182. For example, the driver traveling in the positive direction would experience moderate congestion between locations represented by point location identification code 04456 and 04459 and would experience more serious congestion between locations represented by point location identification code 04453 and 04455.

TABLE XIII

| Location Code | Direction | Extent | End Time/ Duration Code | Event Code |
|---|---|---|---|---|
| 04450 | Positive | 0 | 2:45/0 | 75 |
| 04453 | Positive | 2 | 2:45/0 | 74 |
| 04456 | Positive | 3 | 2:45/0 | 75 |
| 04459 | Negative | 3 | 3:00/1 | 75 |
| 04455 | Negative | 2 | 3:00/1 | 73 |

The above description for aggregating traffic flow data having below normal speed conditions illustrates one embodiment. Alternative embodiments for aggregating traffic flow data having below normal speed conditions are possible.

According to one alternative embodiment, the central facility 26 aggregates all traffic flow data not just the locations having below normal traffic speed. By aggregating all traffic flow data, the central facility 26 not only identifies portions of the road network experiencing congestion but also portions of the road network experiencing normal traffic flow.

In another embodiment, the central facility 26 may perform statistical analysis to aggregate the locations and to reduce the affect of outlier speed values, such as no reported speeds or abnormal speeds. The central facility 26 may consider aggregating a location that has no reported speed or an abnormal speed with surrounding locations. For example, locations 01111, 01112 and 01113 each have a current speed of 25, location 01114 located a quarter of a mile from location 01113 has no reported speed, location 01115 located a quarter of a mile from location 01114 has a speed of 25, and locations 01116 and 01117 have a current speed of 25. In this example, because location 01114 is a short distance between two stretches of locations having similar speeds, locations 01111 through 01117 may be aggregated together even though location 01114 has no reported speed. In another embodiment, the central facility 26 considers the previously reported speed of a location that has no currently reported speed or an abnormal speed. For example, locations 01111, 01112 and 01113 each have a current speed of 25, location 01114 has no currently reported speed but reported a speed of 25 five minutes prior, location 01115 and locations 0115, 01116 and 01117 have a current speed of 25. In this example, because location 01114 had a previously reported similar speed to the current speeds of the other locations, locations 01111 through 01117 may be aggregated together even though location 01114 has no reported speed.

In another alternative embodiment, in addition to aggregating locations having related speeds, the central facility 26 may consider the distance separating adjacent locations. For example, locations 01111, 01112 and 01113 each have a current speed of 25, location 01114 located a quarter of a mile from location 01113 has a current speed of 35, location 01115 located a quarter of a mile from location 01114 has a speed of 25, and locations 01116 and 01117 have a current speed of 25. In this example, because location 01114 is located a short distance between two stretches of locations having similar speeds, locations 01111 through 01117 may be aggregated together even though the speed at location 01114 is outside the threshold value.

F. Data Prioritization

The congestion events repository 180 and the resolved traffic incident data repository 170 contain numerous data records representing the traffic and road conditions at numerous locations along the road network 12 of the geographic region 10. Due to the large number of records, at step 96 of FIG. 4, the central facility 26 prioritizes the data records with the prioritization subprogram 100. Data prioritization may be important because a limited number or subset of the messages may be broadcasted and/or processed by the navigation system 30. For example, the number of traffic messages 22 broadcasted or handled by the navigation system 30 may be limited to a fixed number, such as one hundred messages. Additionally, it is desirable to prioritize traffic messages because the navigation system 30 may wish to process the messages with a higher priority first. Moreover, the broadcaster may desire to broadcast the traffic messages with a higher priority more frequently than the messages having a lower priority. FIG. 7 illustrates the steps performed by the central facility 26 to prioritize the congestion event and resolved incident data records into a set of prioritized traffic data records.

At step 184, the central facility 26 determines a length of the road network 12 affected by each congestion event and traffic incident. In one embodiment, the central facility 26 uses a road length table 186 stored in memory that contains an actual road length value between each adjacent location represented with the point location identification codes. For example, for the congestion event that begins at point location 04450 and extends 3 point locations to location code 4453, the central facility 26 sums the road length values from the road length table 186 between locations 4450 and 4451, between locations 4451 and 4452, between locations 4452 and 4453 to determine the length of the congestion event.

After determining the road length value affected by each of the congestion events stored in the congestion event repository 180 and the traffic incident data repository 180, the central facility 26 prioritizes the congestion events and traffic incidents based on their associated road length values at step 188. In one embodiment, the central facility 26 prioritizes the congestion event or traffic incident with the longest associated road length value as first, the next event or incident with the second longest associated road length value as second and so on in sequence until all of the congestion events or traffic incidents are prioritized. In another embodiment, the central facility 26 assigns priority levels to the events or incidents. For example, the events or incidents with the longest associated road length value are assigned the highest priority while events and incidents with smaller associated road length values are assigned lower priority.

At step 190, the central facility modifies the priority of the prioritized congestion events and traffic incidents based on event codes. In one embodiment, traffic incidents are given higher priority over congestion events. Additionally, certain incidents, such as lane closures, are given higher priority than other incidents, such as traffic equipment status. The central facility 26 may select traffic incidents having an associated high priority event code and modify their priority upward. That is, one traffic incident with a high priority event code is given a higher priority than traffic incidents and congestion events having longer associated road lengths. In one embodiment, the central facility 26 modifies the priority of traffic incidents and congestion events within predetermined ranges of road lengths. For example, the central facility 26 may use event code to reorder the priority of all congestion events and traffic incidents that have associated road lengths within an established range of road lengths, such as from one to two miles of road length.

At step 192, the central facility 26 modifies the priority of the prioritized congestion events and traffic incidents based on road type. In one embodiment, the central facility 26 may select traffic incidents and congestion events on expressways and major arterial roads and modify their priority upward ahead of traffic incidents and congestion events on less important roads. That is, one traffic incident on an expressway is given a higher priority than traffic incidents and congestion events on less important road types. In one embodiment, the traffic location table 110 may identify which linear locations have the high priority by providing a rank or weighting factor. In one embodiment, the central facility 26 modifies the priority of traffic incidents and congestion events according to road type within predetermined ranges of road lengths. For example, the central facility 26 may use road type to reorder the priority of all congestion events and traffic incidents that have associated road lengths within an established range of road lengths, such as from one to two miles of road length.

At step 194, the central facility 26 modifies the priority of the prioritized congestion events and traffic incidents based on point location identification code encompassed by the congestion events and traffic incidents. Similar to modifying priority by road type, the central facility 26 may select traffic incidents and congestion events that include important point locations and modify their priority upward ahead of traffic incidents and congestion events that include less important point locations. That is, one traffic incident that includes a point location representing a critical junction on an expressway is given a higher priority than traffic incidents and congestion events including less important point locations. In one embodiment, the traffic location table 110 may identify which point locations have the high priority by providing a rank or weighting factor. In one embodiment, the central facility 26 modifies the priority of traffic incidents and congestion events within predetermined ranges of road lengths. For example, the central facility 26 may use point location identification codes to reorder the priority of all congestion events and traffic incidents that have associated road lengths within an established range of road lengths, such as from one to two miles of road length.

At step 196, the central facility 26 modifies the priority of the prioritized congestion events and traffic incidents based on co-location with or connection to another event or incident. In one embodiment, congestion events related to traffic incidents are given lower priority over congestion events for which there is no related traffic incident. The central facility 26 identifies congestion events that share point location identification codes with traffic incidents and modifies the priority of the congestion event downward. That is, the central facility 26 lowers the priority of a congestion event sharing a group of point location identification codes with a traffic incident, such as an accident. In one embodiment, the central facility 26 modifies the priority of traffic incidents and congestion events within predetermined ranges of road lengths. For example, the central facility 26 may use co-location or connection of the events or incidents to reorder the priority of all congestion events and traffic incidents that have associated road lengths within an established range of road lengths, such as from one to two miles of road length.

At step 198, the central facility 26 modifies the priority of the prioritized congestion events and traffic incidents based on direction associated with the congestion events and traffic incidents. At certain times of the day, such as during morning rush hour, the majority of the vehicles using the road network may be traveling in a direction toward the center of a city. Accordingly, the central facility 26 modifies the priority of the congestion events and traffic incidents to give higher priority to congestion events and traffic incidents having a direction component that corresponds to a preferred direction, such as into the city center during morning rush hour. The central facility 26 may select traffic incidents and congestion events that include the preferred direction and modify their priority upward ahead of traffic incidents and congestion events that include less important direction. That is, one traffic incident that includes the preferred direction is given a higher priority than traffic incidents and congestion events including less important directions. In one embodiment, the central facility 26 modifies the priority of traffic incidents and congestion events within predetermined ranges of road lengths. For example, the central facility 26 may use direction to reorder the priority of all congestion events and traffic incidents that have associated road lengths within an established range of road lengths, such as from one to two miles of road length.

Furthermore, at step 200, the central facility 26 may modify the priority of the prioritized congestion events and traffic incidents based on duration or any other factor.

After the central facility 26 has prioritized the congestion events and traffic incidents, the central facility 26 stores the prioritized congestion events and traffic incidents in a prioritized traffic data repository 202.

Data prioritization is advantageous because a selected number of traffic messages for broadcast may be selected based on the established priority with the higher priority messages selected before the lower priority messages. Additionally, the traffic messages may be broadcast and/or processed by the navigation system 30 based on the established priority with the higher priority messages selected for broadcast and/or processing before the lower priority messages. Additionally, traffic messages with a higher priority may be broadcasted more frequently than messages with a lower priority.

The above description for prioritizing the congestion events and traffic incidents illustrates one embodiment. Alternative embodiments for prioritizing the congestion events and traffic incidents are possible. Alternatively, rather than creating a priority based on road length and modifying the priority based on road length, any other factor may be used to create the original priority, such as event code, duration, road type or any other factors. Additionally, each factor may be weighted to determine an appropriate prioritization. For example, the priority may be based upon a score provided by a weighted equation considering numerous factors, such as road length, event code, duration, road type or any other factors.

G. Data Formatting

1. General Formatting

Referring to FIG. 4, the central facility 26 formats the prioritized traffic data stored in the prioritized traffic data repository 202 into traffic messages 22 with a formatting subprogram 104. In one embodiment, the central facility 26 may provide the traffic messages 22 in a variety of different formats for transmission by different broadcasters and for use with different end users. FIG. 10 illustrates one example of the data components of a traffic message 22. The traffic message 22 includes the following data components: an event description 22(1), a location 22(2), a direction 22(3), an extent 22(4), a duration 22(5) and advice 22(6). In alternative embodiments, the traffic message 22 may also include components that provide other information **22(*n*)**.

The event description component 22(1) may include data that describe a traffic event type 22(1)(1) along with data that describe a level of severity 22(1)(2) of the traffic condition 22(1)(1). By convention, the location portion 22(2) of a message 22 specifies the location at which a traffic queue begins. This location may be referred to as the primary location or the head. The message 22 also indicates a secondary location or tail. The message 22 indicates the secondary location indirectly, i.e., by means of the direction and extent 22(4). The extent 22(4) indicates how many location codes from the primary location are affected at the level of severity (i.e., 22(1)(2)) indicated in the message. The direction component 22(3) includes data that indicate the direction of traffic affected. The duration component 22(5) provides an expected amount of time that the traffic condition will likely exist. The advice component 22(6) provides a recommendation for a diversion of route.

According to one embodiment, the traffic message 22 conforms to the standard format for ALERT-C messages established in the RDS-TMC system. For example, in the RDS-TMC system, the event description 22(1), including description 22(1)(1) and severity 22(1)(2), is an ALERT-C event code, and the duration 22(5) is an ALERT-C duration code. In the RDS-TMC system, the location 22(2) portion of the message 22 includes a RDS-TMC location code 204. The RDS-TMC location code 204 includes a location number 204(1), a location table number 204(2), a country code 204 (3), and a direction 204(4). The location number 204(1) is a unique number within a region to which one location table (i.e., a database of numbers) corresponds. The location table number 204(2) is a unique number assigned to each separate location table. The country code 204(3) is a number that identifies the country in which the location referenced by the location number 204(1) is located. The direction 204(4) takes into account bi-directionality.

The central facility 26 may format the prioritized traffic data into traffic messages 22 that correspond to the ALERT-C messages established in the RDS-TMC system. Additionally, different traffic message formats are possible. The different traffic message formats may have event descriptions, location descriptions or duration descriptions different from the format of the ALERT-C messages. To format the prioritized traffic data into traffic messages 22, the central facility 26 performs the steps illustrated in FIG. 11.

Figure 11:
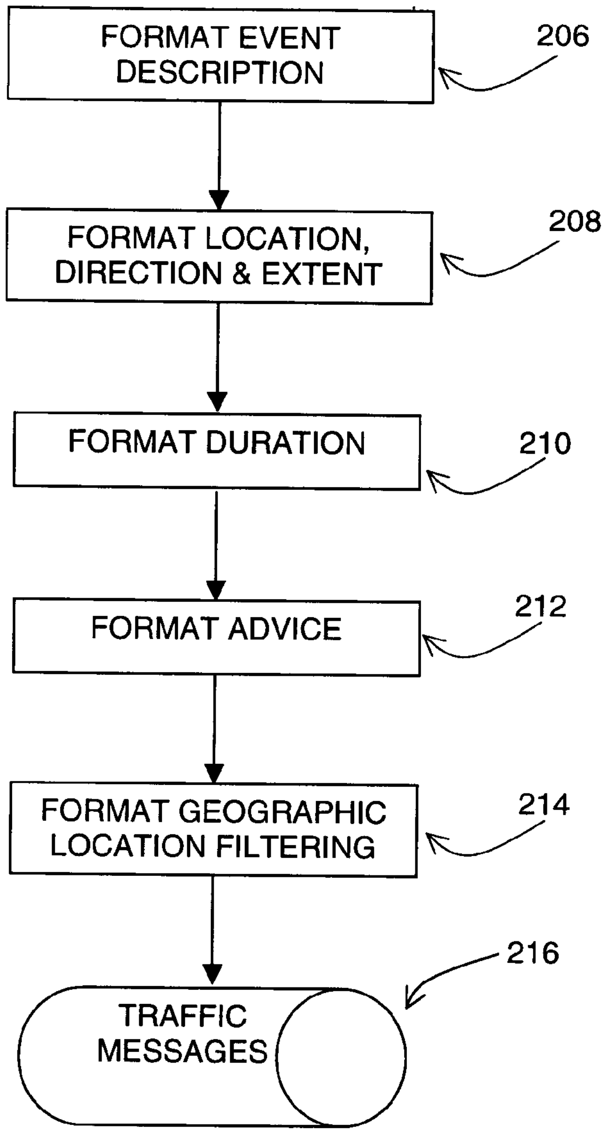
FIG. 11 is a flow chart of the steps performed by the central facility to format the traffic data into traffic messages.
Figure 12:
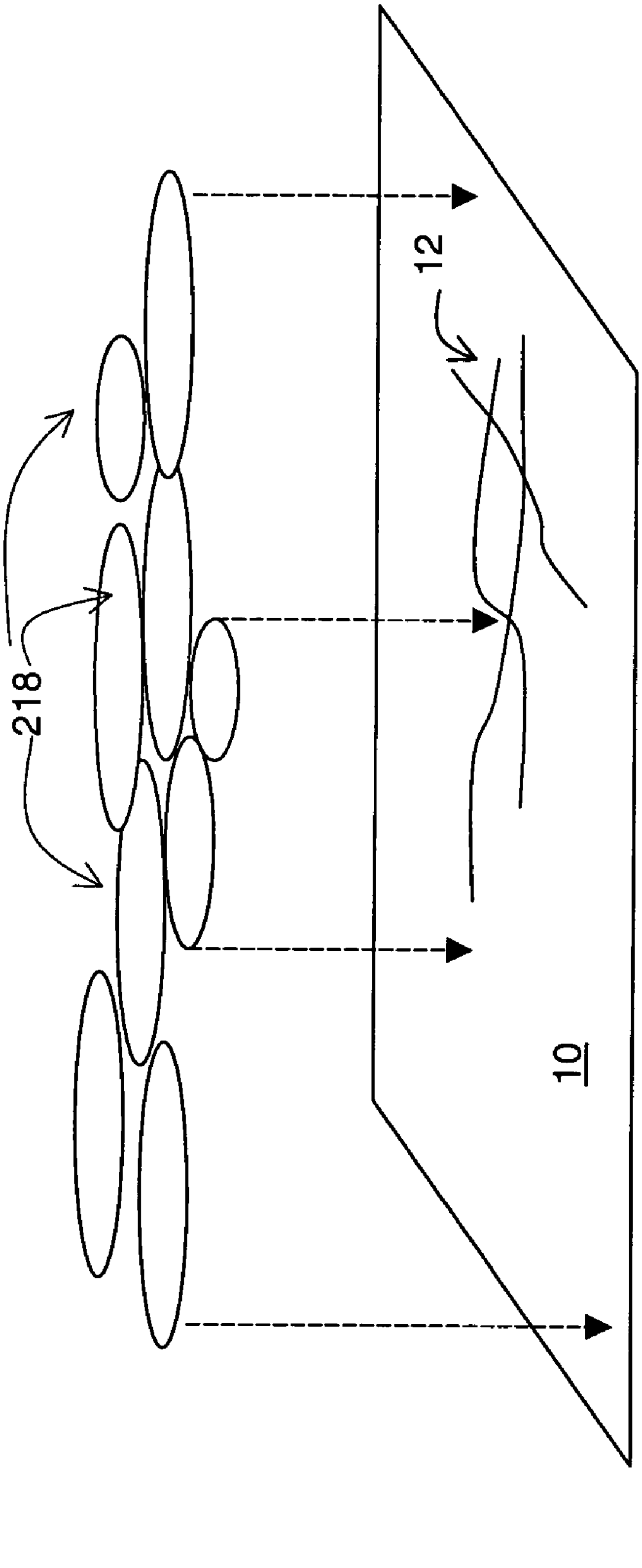
FIG. 12 illustrates formation of broadcast service areas within the geographic region of FIG. 1.

Referring to FIG. 11, at step 206, the central facility 26 formats the event code component of each data record of the prioritized traffic data to provide the event description component 22(1) of the traffic messages 22. The event description component 22(1) may be in the form of a textual description of the event and its severity, an event code according to RDS-TMC ALERT-C protocol or any other appropriate form. If necessary, the central facility 26 converts the event code associated with each record of the prioritized traffic data into the desired event description format with a conversion table (or other suitable data structure).

At step 208, the central facility 26 formats the point location identification code, direction and extent components of each data record of the prioritized traffic data to provide the location 22(2), direction 22(3) and extent 22(4) components of the traffic messages 22. The location 22(2), direction components 22(3) may be in the form of location codes similar or different from the point location identification codes and directions of the traffic location table 110, a textual description of the location, direction and extent or any other appropriate form. If necessary, the central facility 26 converts the point identification location code, direction and extent associated each data record of the prioritized traffic data into the desired location code, direction and extent with a conversion table (or other suitable data structure) in a similar manner as discussed above in conjunction with resolving the collected data. The central facility 26 may convert the point identification location code, direction and extent associated each record of the prioritized traffic data into a textual description of the location using the road number 120, road name 122 and first name 124 components of the point location identification code in the traffic location table 110. For example, the textual description may provide the main road, a cross road at which the traffic incident begins and cross road at which the traffic incident ends.

At step 210, the central facility 26 formats the duration component of each data record of the prioritized traffic data to provide the duration component 22(5) of the traffic messages 22. The duration component 22(5) may be in the form of an amount of time until the traffic condition is expected to end, a time and date at which the traffic condition is expected to end, a duration code according to RDS-TMC ALERT-C protocol or any other appropriate form. If necessary, the central facility 26 converts the duration associated each record of the prioritized traffic data into the desired duration form with a conversion table (or other suitable data structure).

At step 212, the central facility 26 identifies a possible alternative route to avoid the traffic condition for each data record of the prioritized traffic data for the advice component 22(6) of the traffic messages 22. To generate the advice component 22(6), the central facility 26 performs navigation functions using the prioritized traffic data. In one embodiment, central facility 26 includes methods and programming such as disclosed in U.S. Pat. No. 6,438,561, entitled "METHOD AND SYSTEM FOR USING REAL-TIME TRAFFIC BROADCASTS WITH NAVIGATION SYSTEMS." U.S. Pat. No. 6,438,561 discloses a method and system in which location reference codes used in the prioritized traffic data records are used to provide route calculation that considers traffic conditions.

2. Formatting for Geographic Location Filtering

Because the central facility 26 may develop traffic messages 22 for a large geographic region 10, such as the continental United States of America, the central facility 26 formats the prioritized traffic data, and thus the traffic messages 22, for geographic location filtering at step 214 of FIG. 11. In one embodiment, the central facility 26 defines broadcast service areas 218 in the geographic region 10 as shown in FIG. 12. Each broadcast service area 218 contains a portion of the road network 12. Each broadcast service area 218 may cover different portions of the road network 12 or same portions of the road network. For example, one broadcast service area 218 may cover the Los Angeles metropolitan area, another broadcast service area 218 may cover the San Diego metropolitan area, and still another broadcast service area 218 may cover both the Los Angeles metropolitan area and the San Diego metropolitan area.

In one embodiment, the traffic provider 24 predefines the broadcast service areas 218 and identifies which roads and locations are included within each of the broadcast service areas 218. In another embodiment, the broadcaster predefines the broadcast service areas 218 and identifies which roads and locations are included within each of the broadcast service areas 218.

In one embodiment, the traffic location tables 110 include the broadcast service areas 218 as the area locations in the location type column 118 (see FIG. 5). Each broadcast service area 218 has a location identification code, such as 00001 and 00002. The roads and locations along the roads (linear locations and point locations of the traffic location table 110) included in each of the broadcast service areas 218 contain the identification code of their respective broadcast service areas in the area reference column 128. In another embodiment, the central facility 26 establishes a broadcast service area data structure that identifies the roads and locations along the roads included in each of the broadcast service areas 218. In one embodiment, linear locations and point locations may be located in multiple broadcast service areas.

To allow geographic location filtering of the traffic messages 22, the central facility 26 associates each of the data records of the prioritized traffic data with the broadcast service area code 220 corresponding to the broadcast service area 218 in which the traffic condition is located. In one embodiment, the central facility 26 incorporates the broadcast service area code 220 into the location component 22(2) of the traffic message 22 (see FIG. 10). For example, the broadcast service area code 220 may be incorporated into the message in a similar manner as the location table number 204(2) and the country code 204(3) in the RDS-TMC system.

Associating traffic messages 22 with the broadcast service area code 220 allows the navigation system 30 to perform geographic location filtering on the received traffic messages 22. The navigation system 30 that receives the traffic messages 22 may use the broadcast service area code 220 to filter the received traffic messages into a set that is more geographically relevant to the current location of the vehicle 16. For example, if the vehicle 16 is located in the Los Angeles metropolitan area, the navigation system 30 may filter the received traffic messages to obtain a set of messages having the broadcast service area code 220 corresponding to the Los Angeles metropolitan area. Additionally, the traffic messages 22 may be filtered to obtain messages having the broadcast service area code(s) 220 as specified by the user of the navigation system 30 or the user of the non-vehicle 18. Furthermore, the navigation system 30 may filter the traffic messages to obtain messages having broadcast service area codes 220 corresponding to a planned route. Moreover, the navigation system 30 may filter the traffic messages to obtain messages having the broadcast service area codes 220 corresponding to the extent of a map display associated with the navigation system 30. In another embodiment, the traffic messages may be filtered to obtain messages having the broadcast service area codes 220 corresponding to subscription information. For example, a driver may subscribe to a broadcasting service to receive traffic messages for the Los Angeles metropolitan area.

After filtering the received traffic messages, the navigation system 30 processes the traffic messages 22 in their prioritized order. By performing geographic location filtering using the broadcast service area code, the navigation system may process significantly less information to provide traffic related features.

Associating traffic messages 22 with the broadcast service area code 220 also allows the traffic provider 24 to perform geographic location filtering of the traffic messages 22 to transmit only a subset of the messages 22 to the broadcaster. The broadcaster may want traffic messages 22 describing traffic conditions in only specific geographic areas and not all of the geographic areas. The traffic provider may use the broadcast service area code 220 to filter the traffic messages 22 to a set that relate to conditions within the geographic areas specified by the broadcaster. Then, the traffic provider 24 transmits the desired set of traffic messages 22 to the broadcaster. For example, if the broadcaster only wants traffic messages 22 for the Los Angeles metropolitan area, the traffic provider 24 would filter the traffic messages to obtain a set of messages having the broadcast service area code 220 corresponding to the Los Angeles metropolitan area.

Associating traffic messages 22 with the broadcast service area code 220 also allows the broadcaster to perform geographic location filtering of the traffic messages 22. The broadcaster may have separate broadcast equipment for different geographic areas and wish to broadcast traffic messages 22 describing traffic conditions in each of the separate geographic areas with the separate broadcast equipment. The broadcaster may use the broadcast service area code 220 to filter the traffic messages 22 into different sets that relate to conditions within each of the geographic areas. Then, the broadcaster transmits the desired set of traffic messages 22 with the specified broadcast equipment. For example, if the broadcaster has broadcast equipment in the Los Angeles metropolitan area and the San Diego metropolitan area, the broadcaster would filter the traffic messages to obtain one set of messages having the broadcast service area code 220 corresponding to the Los Angeles metropolitan area and another set having the broadcast service area code 220 corresponding to the San Diego metropolitan area.

The broadcast service area codes 220 provide significantly more precise geographic location filtering than provided in the RDS-TMC system. The country code 204(3) and location table number 204(2) in the RDS-TMC system only identify the traffic table containing the location(s) specified by the message. The country code 204(3) identifies which set of traffic tables must be used, i.e., the traffic tables pertaining to the specified country of the country code.

Currently, the traffic table numbers are used for versioning, expansion or for distinction between location numbering authorities. Versioning refers to the retiring of old numbers, and expansion refers to a new table either replacing or supplementing an existing table. Current table numbers have been assigned to broad geographic regions including multiple states and multiple metropolitan areas. Once established, table numbers are difficult to reassign or reorganize. For example, all interested parties, including governmental agencies, must agree to the division and organization of geographies between tables. Additionally, once a table number has been assigned, the table number cannot be reassigned. Because the table numbers cannot be reassigned, geographic areas already established and organized by table numbers cannot be split, combined or modified in the future. Furthermore, expanding the table number to support more than the current 64 tables of the ALERT-C format would require physical structure change in many of the existing applications that use the traffic tables.

For these reasons, table numbers only enable broad geographic filtering. A single traffic location table may include locations that cover multiple metropolitan areas. A single country may also include multiple metropolitan areas. The broadcast service area codes 220 allow many applications to perform geographic location filtering at a more detailed level than provided in the RDS-TMC system, such a filtering by metropolitan area or other geographic areas, while supporting the established table numbers.

H. Traffic Message Distribution

Referring to FIG. 4, the central facility 26 distributes the formatted traffic messages 22 for broadcast at step 106 with a distribution subprogram 108. In one embodiment, the central facility 26 may distribute the traffic messages 22 to a variety of different broadcasters. One commercial broadcaster may desire to receive all of the traffic messages 22 formed from the prioritized traffic data records while another commercial broadcaster may desire to receive a subset of the traffic messages 22 formed from the prioritized traffic data records. To accommodate the different broadcasters, the central facility 26 filters the traffic messages 22 into a desired set of traffic messages 22 as specified by the broadcaster.

For example, if the central facility 26 has traffic messages 22 that describe traffic conditions across the United States, a broadcaster may desire only a set of the traffic messages 22 that relate to traffic conditions in the Los Angles metropolitan area. For this example, the central facility 26 performs geographic area filtering on the traffic messages 22 to obtain a set of traffic messages that have the broadcast service area code corresponding to the Los Angles metropolitan area. The central facility 26 then distributes the set of traffic messages that have the broadcast service area code corresponding to the Los Angles metropolitan area to the broadcaster. Additionally, the central facility 26 may perform geographic location filtering to provide a subset of the traffic messages 22 that occur on certain specified roads. For filtering by road, the central facility 26 filters the traffic messages 22 using the linear location identification code associated with the point location identification codes of the traffic messages 22.

The central facility 22 also filters the traffic messages 22 by a number of messages desired by the broadcaster. For example, the broadcaster may desire a set of two hundred traffic messages 22. The central facility 22 provides the first two hundred traffic messages 22 formed from the prioritized traffic data records. Additionally, the broadcaster may desire a set of twenty traffic messages for the Los Angeles metropolitan area. To provide the set of twenty Los Angeles traffic messages, the central facility 26 performs geographic area filtering on the traffic messages 22 from the prioritized traffic data records to obtain a set of traffic messages that have the broadcast service area code corresponding to the Los Angles metropolitan area. Next, the central facility provides the first twenty messages from the set of traffic messages relating to the Los Angeles metropolitan area.

In one embodiment, the central facility 26 transmits the traffic messages 22 to the broadcaster with a streaming data feed comprised of packets of messages. A packet is a group of traffic messages packaged in a manner to control the delivery and verification of data in controllable data sizes. Each traffic message 22 is contained entirely within one of a series of traffic packets. FIG. **13*a* illustrates a traffic packet 222 including a first header 222(1), a second header 222(2), a service provider message 222(3) and one or more traffic messages 222(4)**.

The first and second headers 222(1) and 222(2) indicate the start of the service provider message component 222(3) and the traffic message components 222(4). Additionally, the headers verify data accuracy independent of the streaming transport layer as know to those skilled in the art.

FIG. **13*b* illustrates a format of the service provider message 222(3) of the traffic packet 222. The service provider message 222(3) contains five bytes. The service provider message 222(3) has the format of an ALERT-C message as specified by the RDS-TMC system. The service provider message 222(3) reserves bits 7-5 of byte 1. Bit 4 of byte 1 specifies the message type that is set to 1 to indicate the service provider message. Bits 3-0 of byte 1 identify the service and traffic location table provider. Bits 7-2 of byte 2 identifies the traffic location table number (table identification number 114 of FIG. 5) containing the location information (point location identification code 116 of FIG. 5) provided in the following traffic message component 222(4). Bits 1-0 of byte 2 and bits 7-6 of byte 3** are reserved.

In the service provider message 222(3), bits 7-0 of bytes 4 and 5 identify the broadcast service area code 220 of the location information provided in the following traffic message(s) 222(4). Typically, bits 7-0 of bytes 4 and 5 of the ALERT-C message as specified by the RDS-TMC system are used to identify alternative frequency information. The alternative frequency information species the frequencies of other broadcasts provided by a network radio stations that broadcast the same traffic service. By identifying the broadcast service area code 220 using the portion of the ALERT-C message normally reserved for alternative frequency information, the service provider message identifies the broadcast service area code 220 for use by the end user or broadcaster for geographic location filtering of the traffic messages.

Using the portion normally reserved for alternative frequency information provides advantage when broadcast is by satellite radio or cellular phone in which the alternative frequency information is non-applicable.

FIG. 13*c* illustrates a format of the traffic message 222(4) of the traffic packet 222. Each traffic message 222(4) contains five bytes. The traffic message 222(4) shown in FIG. 13*c* has the format of an ALERT-C single group message as specified by the RDS-TMC system. The traffic message 222(4) reserves bits 7-5 of byte 1. Bit 4 of byte 1 specifies the message type that is set to 0 to indicate the traffic message or ALERT-C message. Bit 3 of byte 1 is set to zero identifying that the ALERT-C message is a single group message type. The traffic message 222(4) may also have the format of multi-group ALERT-C message as known to one skilled in the art.

Referring to FIG. 13*c*, bits 2-0 of byte 1 provides the duration code 22(5) indicating the expected duration of the traffic condition identified in the traffic message 222(4). Bit 7 of byte 2 provides a diversion 22(6) that is set to zero recommending no diversion. Bit 6 of byte 2 provides the direction 22(3) of traffic flow affected by the traffic condition (0 represents positive direction, 1 represents negative direction). Bits 5-3 of byte 2 provide the extent 22(4) of the traffic condition. Bits 2-0 of byte 2 and bits 7-0 of byte 3 provide the event code 22(1) of the traffic condition. Bits 7-0 of bytes 4 and 5 provide location information 22(2) (point location identification code 116 of FIG. 5).

In one embodiment, more than one traffic message 222(4) follows the service provider message 222(3). All traffic messages 222(4) following a service provider message 222 (3) are related to the traffic location table identification number and broadcast service area code contained in the last service provider message 222(3). If the traffic location table identification number or broadcast service area code changes for the next traffic message 222(4), the service provider message 222(3) indicating the new traffic location table identification number or broadcast service area code is supplied before the next traffic message 222(4).

The above description for distributing the traffic messages 22 illustrates one embodiment. Alternative embodiments for distributing the traffic messages are possible.

In an alternative embodiment, the central facility 26 directly broadcasts the traffic messages 22. To broadcast the traffic messages, the central facility 26 includes equipment and programming 20(3) that includes interfaces to transmitters, programming that communicates formatted messages at regular intervals to the transmitters, and so on.

In another alternative embodiment, the traffic messages developed and transmitted may include information other than the traffic and road condition information. For example, the traffic messages may include weather related information relevant to portions of the road network. It is intended that the foregoing detailed description be regarded as illustrative rather than limiting and that it is understood that the following claims including all equivalents are intended to define the scope of the invention.

We claim:

1. A method for developing a plurality of traffic messages using a computing platform, said method comprising:

using the computing platform to obtain of traffic data indicating a plurality of traffic conditions on a road network, said traffic data includes a location description for each of said traffic conditions;

for each of said traffic conditions, converting said location description into a location reference code assigned by a traffic message supplier; and transmitting said traffic messages representing said traffic conditions, each of said traffic messages include said location reference code of one of said traffic conditions wherein said traffic data includes an event description and said method further comprising for each of said traffic conditions, converting said event description into a event code assigned by said traffic message supplier.

2. The method of claim 1 wherein said location description is an alphanumeric description.

3. The method of claim 1 wherein said location description is a text description.

4. The method of claim 1 wherein said location description is a description of a landmark proximate said traffic condition on said road network, wherein said landmark description being converted into said location reference code.

5. The method of claim 1 wherein said location description provides a latitude and longitude position of said traffic condition, wherein said latitude and longitude position being converted into said location reference code.

6. The method of claim 1 wherein said converting step is performed with a conversion table.

7. The method of claim 1 wherein said converting step comprises geo-coding said location description with a geographic database.

8. The method of claim 1 further comprising, for each of said traffic conditions, determining a direction affected by said traffic condition.

9. The method of claim 1 wherein said event description is a traffic speed.

10. A method for developing a plurality of traffic messages using a computing platform, said method comprising:

using the computing platform to obtain traffic data indicating a plurality of traffic conditions on a road network, said traffic data includes a location description for each of said traffic conditions;

for each of said traffic conditions, converting said location description into a location reference code assigned by a traffic message supplier; and transmitting said traffic messages representing said traffic conditions, each of said traffic messages include said location reference code of one of said traffic conditions, wherein said location description provides a main road along which said traffic condition exists, a start description indicating a beginning of said traffic condition on said main road and an end description indicating an end of said traffic condition on said main road, wherein said main road and said start description being converted into a first location reference code and said main road and said end description being converted into a second location reference code.

11. The method of claim 10 further comprising determining a number of contiguous location reference codes affected by said traffic condition from said first location reference code to said second location reference code.

12. A method for developing a plurality of traffic messages using a computing platform, said method comprising:

using the computing platform to obtain traffic data indicating a plurality of traffic conditions on a road network, said traffic data includes a location description for each of said traffic conditions;

for each of said traffic conditions, converting said location description into a location reference code assigned by a traffic message supplier; and transmitting said traffic messages representing said traffic conditions, each of said traffic messages include said location reference code of one of said traffic conditions, wherein said converting step is performed with a conversion table, wherein if said conversion table does not provide a match between said location description and said location reference code, said traffic condition is excluded from said transmitted traffic messages.

13. A method for developing a plurality of traffic messages using a computing platform, said method comprising:

using the computing platform to obtain traffic data indicating a plurality of traffic conditions on a road network, said traffic data includes a location description for each of said traffic conditions;

for each of said traffic conditions, converting said location description into a location reference code assigned by a traffic message supplier; and transmitting said traffic messages representing said traffic conditions, each of said traffic messages include said location reference code of one of said traffic conditions, wherein said traffic data includes a duration and said method further comprising determining whether said duration has expired, if so, said traffic condition is excluded from said transmitted traffic messages.

14. A method for developing a plurality of traffic messages using a computing platform, said method comprising:

using the computing platform to obtain traffic data indicating traffic conditions at a plurality of locations on a road network, said traffic data includes a location description for each of said traffic conditions;

for each of said traffic conditions, converting said location description into a location reference code assigned by a traffic message supplier and an extent of a number of consecutive location reference codes affected by said traffic condition;

transmitting said traffic messages representing said traffic conditions, each of said traffic messages include said location reference code and said extent of said traffic condition.

15. The method of claim 14 wherein said location description is an alphanumeric description.

16. The method of claim 14 wherein said location of said traffic data provides a road description of a road along which said traffic condition exists, a start description indicating a beginning of said traffic condition along said road and an end description of said traffic condition along said road, wherein said road description and said start description being converted into said location reference code and said road description and said end description being converted into said extent.

17. The method of claim 14 further comprising determining said number of contiguous location reference codes affected by said traffic condition.

18. The method of claim 14 wherein said converting step is performed with a conversion table.

19. The method of claim 14 further comprising, for each of said traffic conditions, determining a direction affected by said traffic condition.

20. The method of claim 14 wherein said converting step comprises geo-coding said location description with a geographic database.

21. A method for developing a plurality of traffic messages comprising:

obtaining traffic data indicating traffic conditions on a road network, said traffic data includes a location description for each of said traffic conditions;

for each of said traffic conditions, converting said location description into a first location reference code and a second location reference code assigned by a traffic message supplier, wherein said first location reference code indicates where said traffic condition begins and said second location reference code indicates where said traffic condition ends; transmitting said traffic messages representing said traffic conditions, each of said traffic messages include said first location reference code and said second location reference code of said traffic condition.

22. A method for developing a plurality of traffic messages using a computing platform, said method comprising:

using the computing platform to obtain traffic data indicating a plurality of traffic conditions on a road network, said traffic data includes a location description for each of said traffic conditions, wherein said traffic data includes a duration;

for each of said traffic conditions, converting said location description into a location reference code assigned by a traffic message supplier, and converting said duration into a duration code assigned by said traffic message supplier; and transmitting said traffic messages representing said traffic conditions, each of said traffic messages include said location reference code of one of said traffic conditions.

* * * * *